US011301517B2

(12) United States Patent
Liu et al.

(10) Patent No.: US 11,301,517 B2
(45) Date of Patent: Apr. 12, 2022

(54) METHOD AND SYSTEM FOR IDENTIFYING, MANAGING, AND MONITORING DATA DEPENDENCIES

(71) Applicant: eBay Inc., San Jose, CA (US)

(72) Inventors: Sizhong Liu, Shanghai (CN); Zou Qingnan, Shanghai (CN); Yi Liu, Shanghai (CN); Ian Chi-Yee Ma, Vashon, WA (US); Haowen Zhu, Shanghai (CN)

(73) Assignee: eBay Inc., San Jose, CA (US)

( * ) Notice: Subject to any disclaimer, the term of this patent is extended or adjusted under 35 U.S.C. 154(b) by 176 days.

(21) Appl. No.: 16/869,522

(22) Filed: May 7, 2020

(65) Prior Publication Data

US 2021/0349946 A1    Nov. 11, 2021

(51) Int. Cl.
| | |
|---|---|
| *G06F 16/906* | (2019.01) |
| *G06F 16/9035* | (2019.01) |
| *G06F 16/182* | (2019.01) |
| *G06F 9/38* | (2018.01) |
| *G06F 16/907* | (2019.01) |

(52) U.S. Cl.
CPC .......... *G06F 16/906* (2019.01); *G06F 9/3838* (2013.01); *G06F 16/182* (2019.01); *G06F 16/907* (2019.01); *G06F 16/9035* (2019.01)

(58) Field of Classification Search
CPC .. G06F 16/906; G06F 16/9035; G06F 16/907; G06F 16/182; G06F 9/3838
USPC ........................................................ 707/722
See application file for complete search history.

(56) References Cited

U.S. PATENT DOCUMENTS

| | | | |
|---|---|---|---|
| 9,552,276 B1 | 1/2017 | Hale et al. | |
| 9,639,575 B2 * | 5/2017 | Leida ................. | G06F 16/2452 |
| 10,146,857 B2 | 12/2018 | Ghanea-Hercock et al. | |

(Continued)

FOREIGN PATENT DOCUMENTS

WO    2021/225726 A1    11/2021

OTHER PUBLICATIONS

Monsieur, Geert, et al., "Managing data dependencies in service compositions", The Journal of Systems and Software, vol. 85, Issue 11, Nov. 2021, pp. 2604-2628.*

(Continued)

*Primary Examiner* — Robert Stevens
(74) *Attorney, Agent, or Firm* — FIG. 1 Patents

(57) ABSTRACT

Software is increasingly being developed as a collection of loosely coupled applications. Loosely coupled applications exchange data by publishing data to and retrieving data from a data store, such as a database, a file located on a storage cluster, etc. Data produced by one application and consumed by another is referred to as a data dependency. In some embodiments, an application's data dependencies are identified by analyzing cached query plans associated with the application. Query plans include a hierarchical representation of a query, where non-leaf nodes represent commands and leaf nodes identify data dependencies. An application's data dependencies are identified by traversing the hierarchical representation of the query. Data dependencies consumed by the application are identified by finding leaf nodes that descend from a read command, while data dependencies produced by the application are identified by finding leaf nodes that descend from a write command.

20 Claims, 23 Drawing Sheets

(56) References Cited

U.S. PATENT DOCUMENTS

| | | | |
|---|---|---|---|
| 2006/0271557 A1 | 11/2006 | Harward et al. | |
| 2011/0066719 A1 | 3/2011 | Miryanov et al. | |
| 2014/0095471 A1 | 4/2014 | Deshmukh et al. | |
| 2014/0164047 A1 | 6/2014 | Shafi et al. | |
| 2015/0347507 A1* | 12/2015 | Annapragada | G06F 16/24542 707/718 |
| 2016/0267132 A1 | 9/2016 | Castellanos et al. | |
| 2018/0113916 A1* | 4/2018 | Singh | G06F 16/2465 |

OTHER PUBLICATIONS

Kaviani, Nima, et al., "Cross-Tire Application and Data Partitioning of Web Applications for Hybrid Cloud Deployment", Middleware 2013, LNCS 8275, Beijing, China, Dec. 9-13, 2013, 1993, pp. 226-246.*

Tcurdt, "Provides an API to Analyse and Modify Class Dependencies. It Provides the Core to the Maven Shade Plugin for Removing Unused Classes.", Retrieved from the Internet URL:<http://github.com/tcurdt/jdependency>, Accessed on Jan. 23, 2020, 2 pages.

Lazarescu et al., "Dynamic Trace-Based Data Dependency Analysis for Parallelization of C Programs", IEEE 12th International Working Conference on Source Code Analysis and Manipulation, 2012, 6 pages.

Nipa, "A JDeps Tutorial—Analyze Your Project's Dependencies", Retrieved from the Internet URL: <https://blog.codefx.org/tools/jdeps-tutorial-analyze-java-project-dependencies/>, Jul. 17, 2017, 13 pages.

Microsoft, "Sources of monitoring data for Azure Monitor", Retrieved from the Internet URL: <https://docs.microsoft.com/en-us/azure/azure-monitor/agents/data-sources>, Jun. 10, 2020, 14 pages.

International Search Report received for U.S Patent Application No. PCT/US2021/025376, dated Jun. 24, 2021, 3 pages.

International Written Opinion received for PCT Patent Application No. PCT/US2021/025376, dated Jun. 24, 2021, 5 pages.

* cited by examiner

METHOD AND SYSTEM FOR IDENTIFYING, MANAGING, AND MONITORING DATA DEPENDENCIES

BACKGROUND

Software is increasingly being developed as a collection of loosely coupled applications. Loosely coupled applications are executed on different devices, while data produced by the applications may be stored on still different devices. Loosely coupled applications exchange data by publishing data to a location where a consuming application can access it. Although these systems provide a number of advantages over other architectures, they also exhibit a number of drawbacks. For example, each data producing application may publish data in a different format, to a different location, on a different schedule, and use a different notification mechanism. As a result, data consuming applications must utilize a number of low-level protocols and libraries to accommodate each configuration. These protocols are difficult to implement correctly and are a common source of program errors. Data consuming applications are often also themselves data producing applications, further complicating how data is exchanged. As such, it is a technological challenge to manage and monitor data dependencies between loosely coupled applications.

Another technological challenge to using and maintaining loosely coupled applications is identifying what data each application produces and what data each application consumes. Manually determining these "data dependencies" may be challenging when source code or documentation is missing. Without data dependency information, application upgrades, maintenance, and migration may be difficult if not impossible.

It is with respect to these and other technical considerations that the disclosure made herein is presented.

SUMMARY

To address the above-described issues, the techniques disclosed herein identify, manage, and monitor data dependencies between applications. In one aspect described below, data dependencies are identified by analyzing a query history. For example, cached query plans may be parsed to identify data dependencies previously accessed by an application. Another aspect of the present disclosure manages and monitors data dependencies between applications. For example, a service standardizes how data-producing applications publish the availability of a data dependency. The service may also standardize how data-consuming applications monitor for published data. By improving how data dependencies between applications are identified, managed, and monitored, the cost and complexity of developing multi-application software systems is reduced.

In some embodiments, data dependencies are identified by analyzing a query history. Analyzing historic usage contrasts with a source code analysis or performing synthetic tests to reveal data dependencies. By avoiding a source code analysis, the disclosed techniques can be performed on any application, no matter which programming language it was written in, even if the source code is unavailable. Furthermore, analyzing historic usage reveals data sources that were consumed in real world scenarios, which may be different than data sources consumed in a synthetic testing environment.

In some embodiments, a query history is analyzed by parsing cached query plans to identify data dependencies. A query plan describes how a query engine will perform a data query, including where data is retrieved from or written to. Query plans are cached to avoid having to recompute the plan for each query. In this way, cached query plans create a historical record of queries performed on behalf of an application.

In some embodiments, a query plan contains a hierarchy of data commands and data locations. Commands, such as "insert", "join", or "select", are represented by non-leaf nodes, while data locations are represented by leaf nodes. An application's data dependencies may be identified by selecting leaf nodes (data locations) that are descendants of non-leaf nodes (commands). Leaf nodes that are descendants of read commands, e.g. "select" or "project" commands, identify data dependencies consumed by the application. Leaf nodes that descend from write commands, e.g. "insert" or "update" commands, identify data dependencies produced by the application. By analyzing the cached query plans associated with the application, a complete list of data dependencies produced or consumed by the application can be identified with minimal resource usage.

In some embodiments, a service manages and monitors data dependencies between applications. The service enables data producing applications to manage when and where a data dependency is scheduled to be published. For data consuming applications, the service manages which data dependencies they consume, and what to do if a dependency is not available at the scheduled time.

The service also alerts consuming applications when a data dependency has actually been published. The service may determine that a data dependency has actually been published in a number of ways: receiving an indication directly from the data producing application, monitoring a communication channel designated by the producing application, or directly monitoring the publication location. In response to determining that a data dependency has actually been published, the service forwards an indication that the data dependency has actually been published to any consuming applications.

In some embodiments, when directly monitoring the publication location to determine when the data dependency has been published, the service may register to be notified when a file or database containing the data dependency has been created at the publication location. When notified of the creation, the service may in turn notify consuming applications of actual publication. The service may also poll the publication location for changes indicative of publication, including the creation or modification of a file or database table. In some scenarios, the service may determine an initial state of the publication location, and when polling, may compare the current state of the publication location to the initial state of the publication location. When the current state differs from the initial state, the service may notify consuming applications of actual publication. For example, if a database table where the data dependency will be published already exists, the server may determine an initial number of rows in the table, allowing the server to determine if additional data has been inserted into the table by comparing the current number of rows to the initial number of rows.

By supporting various techniques for determining when a data dependency has actually been published, the service relieves consuming applications of having to make these determinations. Instead of operating and maintaining the mechanisms used to identify when a data dependency is actually published, the consuming application merely registers a list of data dependencies and an alert mechanism via an application program interface (API). This expands the number of data dependencies that an application can depend on, while reducing or eliminating program errors caused by each consuming application individually implementing these mechanisms.

It should be appreciated that the subject matter described above and in further detail below can be implemented as a computer-controlled apparatus, a computer-implemented method, a computing device, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The Detailed Description is described with reference to the accompanying FIGS. In the FIGS., the left-most digit(s) of a reference number identifies the FIG. in which the reference number first appears. The same reference numbers in different FIGS. indicate similar or identical items.

DETAILED DESCRIPTION

In various embodiments, the following Detailed Description presents technologies for identifying, managing, and monitoring data dependencies between loosely coupled applications. It is to be appreciated that while the technologies disclosed herein are primarily described in the context of a distributed computing cluster and a distributed database, the disclosed technologies can also be utilized with any database or computing platform, e.g. Hadoop, Sybase, The Oracle Database™.

Referring to the appended drawings, in which like numerals represent like elements throughout the several FIGURES, aspects of various technologies for identifying, managing, and monitoring data dependencies between loosely coupled applications will be described. In the following detailed description, references are made to the accompanying drawings that form a part hereof, and which are shown by way of illustration specific configurations or examples.

Figure 1:
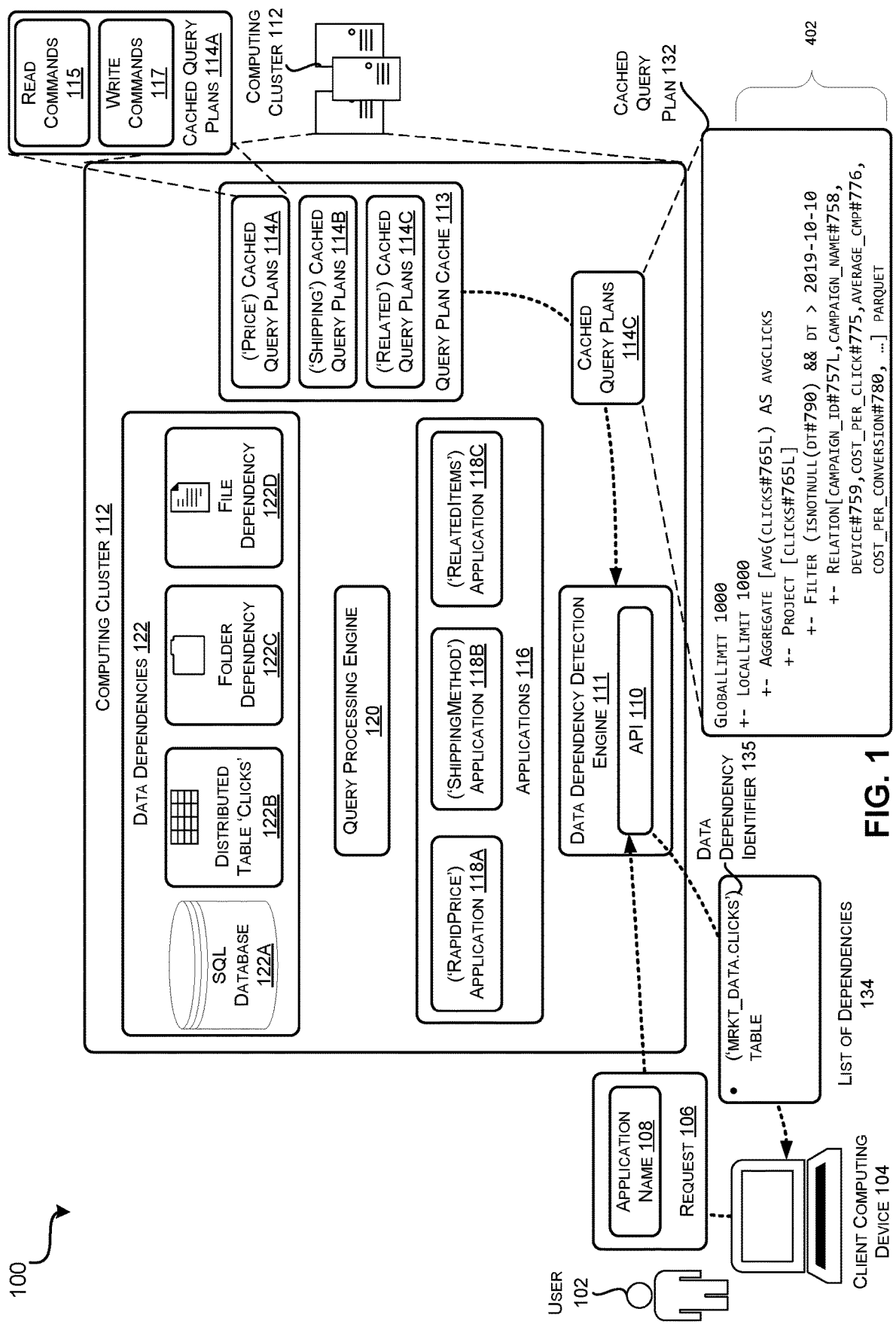
FIG. 1 is a system diagram illustrating one embodiment of a data dependency detection engine that identifies data dependencies consumed by an application.

FIG. 1 is a system diagram 100 illustrating one embodiment of a data dependency detection engine that identifies data dependencies consumed by an application. In some embodiments, user 102 operating client computing device 104 submits a data dependency identification request 106 to an application program interface (API) 110 exposed by data dependency detection engine 111. The data dependency identification request 106 includes an application name 108 of an application 118 to list the dependencies of. In some embodiments, data dependency detection engine 111 returns a list of data dependencies 134, which includes one or more data dependency identifiers 135.

As referred to throughout this document, a data dependency, or just "dependency", refers to a data resource produced by one application for consumption by another application. In this way, the consuming application depends on data generated by the producing application in order for the consuming application to operate properly.

In some embodiments, a data dependency refers to raw data published by a data producing application. Data may be published in a number of structures, including tables, files, folders, streams etc. Data stored in a file may be stored in any type of file, including a binary file, a text-based file, etc. Text-based files may store data in a number of different formats, including comma separated value (CSV), extensible markup language (XML), JavaScript object notation (JSON), base64 encoded, etc. Binary files may also store data in any format, including image files, compressed files, executable files, etc. Data published in a table structure may itself be stored in a file, although, as discussed in more detail below, table data may also be stored in a database, cloud-based table service, etc. Streamed data, which is continuously provided by a data providing application, may be in any of the above-referenced formats.

A data dependency may also refer to a location where data is published. A location may be associated with hardware and/or software that stores, manages, and/or provides access to the data. For example, a data dependency may refer to an addressable portion of a structured query language (SQL) database, a distributed file system (e.g. the Hadoop™ file system), a traditional file system, a cloud-hosted storage service, or the like. For example, some data dependencies may refer to one or more tables in a database, a file or folder on a distributed file system, a file or folder on a traditional file system, or a file or folder on a cloud-hosted storage service. Some data dependencies are tables that reflect the content of a file or folder, including files or folders stored on a distributed file system. For example, a data dependency may be a Hive table that contains data stored in a file on a Hadoop™ clustered file system.

Data dependencies may be scheduled to be published at a defined point in time. The publication time may be for a single publication, e.g. May 17, 2020. The publication time may also repeat, periodically or irregularly. For example, a data producing application may be scheduled to publish data every hour, or every other Sunday. In other scenarios, a data dependency may be published when the operation that generates it has completed.

As referred to throughout this document, "consuming" or "consumption" of data refers to retrieval of the data by an application. Data that is consumed may be copied, such that a copy of the data remains at the published location to be consumed by other applications. In an environment where security is paramount, data that is consumed may be erased after it has been copied.

User 102 may be a person or an automated user agent operating client computing device 104. Client computing device 104 may be any computing device, e.g. a desktop computer, laptop computer, mobile phone, tablet computer, or the like. Application name 108 may be a fully qualified domain name, a unique identifier such as a globally unique identifier (GUID), a universal resource locator (URL), or any other name that uniquely identifies the requested application.

In some embodiments, data dependency detection engine 111 may run on any type or kind of computing device, e.g. an individual server hosted in a data center. In other embodiments, data dependency detection engine 111 may be running on computing cluster 112. Computing cluster 112 comprises a number of server computing devices, often co-located in a data center, server Farm, Etc. Computing clusters utilize software that distributes computation tasks and storage requests among the computing devices in the cluster. For example, computing clusters often support data query operations that can be divided across multiple nodes of the cluster. Results from the computations performed by each node may be aggregated into a single result. One example of a software library used to create a computing cluster is Apache Hadoop™, while one example algorithm used to distribute a data query across a computing cluster is the MapReduce algorithm.

API 110 may be exposed as a hyper-text transfer protocol (HTTP) based API, such as a representational state transfer (RESTful) API or a simple object access protocol (SOAP) API. Additionally, or alternatively, API 110 may be exposed using a binary protocol, remote procedure call, or any other inter-process communication technique.

In response to receiving request 106, data dependency detection engine 111 may identify the application 118 indicated by application name 108. Data dependency Detection engine 111 may then retrieve cached query plans 114 from query plan cache 113. Specifically, data dependency detection engine 111 may retrieve a cached query plan that was generated while performing a data query on behalf of the application 118. Data dependency detection engine 111 may retrieve cached query plans 114 from query plan cache 113 based on application name 108 or based on some other identifying information about application 118, such as an application ID, application URL, etc. In some configurations, data dependency detection engine 111 retrieves all cached query plans associated with the application 118. However, data dependency detection engine 111 may selectively retrieve query plans, including only retrieving query plans that were generated after a defined point in time. Application 118 may be a web application, a web service, or any other remote or server hosted application. As illustrated, application 118 is one of applications 116 that execute on computing cluster 112.

One of the illustrated cached query plans 114, e.g. cached query plans 114A, represents one or more individual query plans that were generated over time by query processing engine 120 as one or more data queries were performed on behalf of a particular application. Query plans are ordinarily cached to save the cost of recomputing them each time a data query is received. However, for the purposes of the disclosed embodiments, the cached query plans server as a historical record of the data queries processed on behalf of a particular application. In some configurations, query processing engine 120 also executes within computing cluster 112, although it is similarly contemplated that application 118, query processing engine 120, query plan cache 113, or any of the other components illustrated in FIG. 1 may execute on an individual server computer.

In some embodiments, query processing engine 120 generates a query plan from a data query by parsing the data query from a text file to a hierarchical abstract syntax tree. In this way, a human readable data query is translated into a set of computer-readable instructions for performing the requested data query. A data query may be expressed in a number of formats or languages, such as structured query language (SQL). Some data queries may target (i.e. retrieve data from or publish data to) a table in a SQL database 122A, a distributed table 122B, a folder 122C, a file 122D, or any other type of data dependency 122. Some data dependencies may be located in a clustered file system, a traditional file system, on a local intranet, or on a remote server. Data dependencies may be hosted by one or more computing devices, and may be located in a computing cloud. Some data queries may target multiple data sources and/or multiple types of data sources. For Example, a data query may retrieve all persons in a human resources database between the age of 30 and 40, and then retrieve photos stored on a distributed file system of each person. Folders, files, and distributed tables may be located on a traditional file system or a distributed file system, such as a file system provided by computing cluster 112.

Query plans generated while processing a data query indicate which tables, files, or other resources should be retrieved in order to perform the data query. Query plans also indicate what operations should be performed on the data, e.g. filters, aggregations, limits, joins, etc. The query plan illustrated in FIG. 1, cached query plan 132, was generated while processing the data query:

"select avg(clicks) from mrkt_data.geo_perf_rpt where dt>'2019-10-10' limit 1000"

This query is designed for a distributed data cluster, e.g. a Hadoop cluster. Query processing engine 120 translated this query into a hierarchy of commands: "global limit", "local limit", "aggregate", "project", "filter", and "relation". Each level in the hierarchy receives as input the output of one or more child nodes.

Specifically, the "relation" command retrieves entries from the "click" field of the "mrkt_data.geo_perf_rpt" table. In some scenarios, the relation command includes the name or other identifying information of the data location it refers to. In other scenarios, the relation command is associated with metadata, e.g. an Apache Spark CatalogTable object, which contains the name or other identifying information of the data location. In either case, the output of the "relation" command is supplied as input to the "filter" command, which limits the results to clicks made after "2019-10-10" (Oct. 10, 2019). The output of the filter command is supplied as input to the "project" command, which like a SQL select statement, could shape or otherwise modify the data it receives. However, in this instance, the "project" command passes the filtered click data to the "Aggregate [avg(clicks #765L) AS avgclicks" command, which computes the average of the number of clicks received. The "global limit 1000" and "local limit 1000" commands limit the total number of query results and the total number of query results returned from each distributed node.

In some embodiments, data source identifiers are extracted from query plans by traversing the hierarchy of commands to locate leaf nodes. As discussed above, leaf nodes indicate the data sources, e.g. which data tables, databases, files, folders, etc., that the query retrieves data from. For each leaf node identified, data dependency detection engine walks up the hierarchy to identify a read command 115, such as 'project' or 'select', or a write command 117, such as 'insert' or 'update'. A read command refers to a command that retrieves, extracts, or otherwise obtains information from a data source. A write command refers to a command that adds, amends, appends, updates, or otherwise pushes information to the data source. When a leaf node is found to be a descendant of a read command, the data source identified by the leaf node is identified as being consumed by the application. When a leaf node is found to be a descendant of a write command, the data source identified by the leaf node is identified as being produced by the application. If a command is both a read and a write command, the application would be considered a consumer and a producer of the data dependency. For example, a command that retrieves data from even-numbered rows of a database table while updating values of odd-numbered rows of the same database table would cause the application that executes that command to be identified as a consumer and a producer of the database table.

In some scenarios, a data query, and the associated query plan, include nested sub-queries. For example, the following query may retrieve all customer records from a customers database, where the customer has placed an order for more than $1,000, as indicated by the sub-query of the orders database:

SELECT * FROM customers
WHERE cust_id IN (SELECT DISTINCT cust_id FROM orders
WHERE order_value>5000);

In these cases, multiple data source dependencies can be identified from a single query plan, e.g. the "customers" database and the "orders" database.

After identifying the data sources read from or written do by the query plans associated with the application name 108, data dependency detection engine 111 may return the list of dependencies 134, including, for example, data dependency identifiers 135.

Figure 2A:
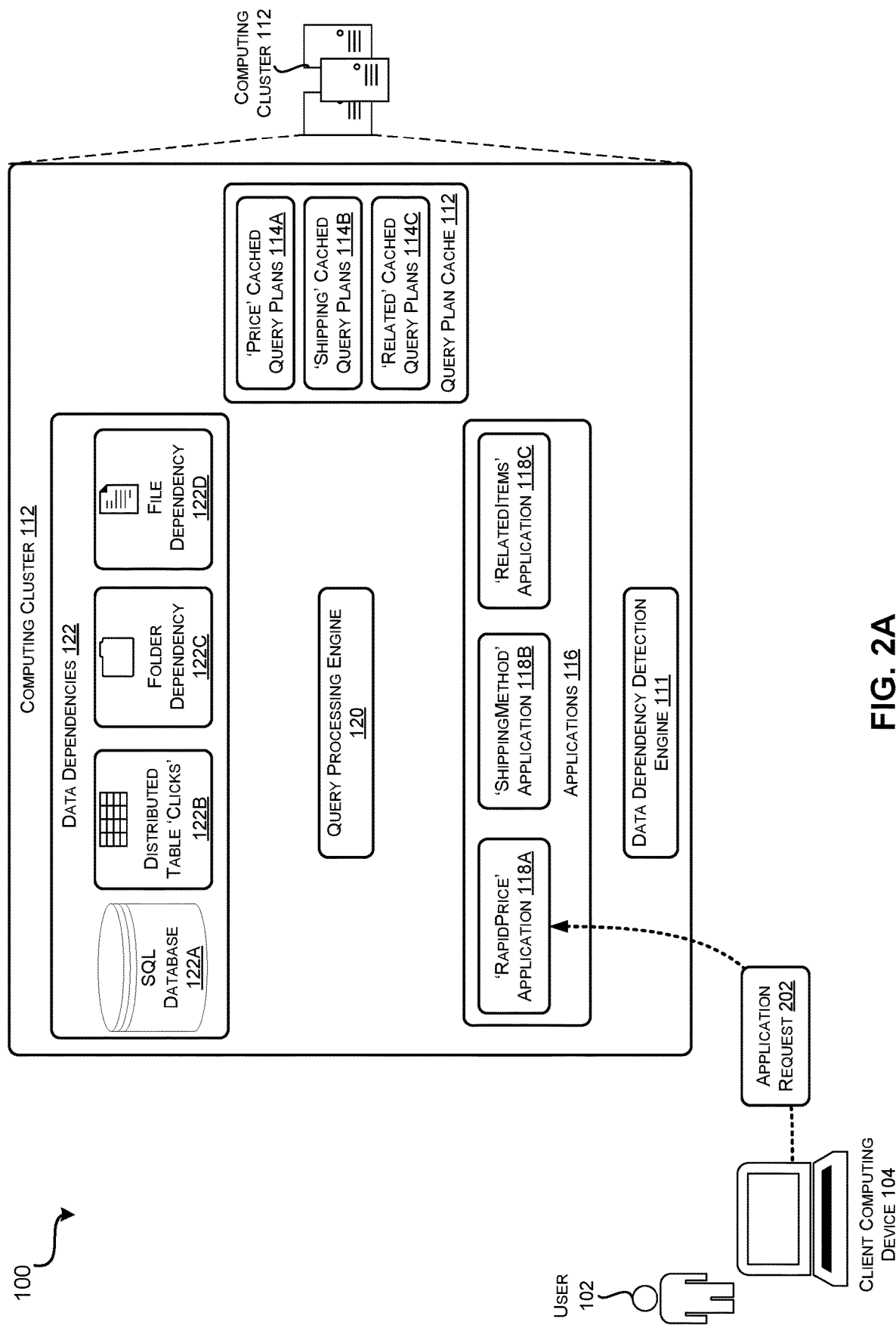
FIG. 2A is a system diagram illustrating receipt of a request from an application.

FIG. 2A is a system diagram 100 illustrating receipt of a request from an application. Application request 202 may be any type of request or other data transmitted from client computing device 104 to application 118. For example, the 'RapidPrice' application 118A may receive a request to estimate a price for an item that user 102 intends to sell. Application request 202 may be a web request addressed to a web server, an email message addressed to an email server, a request to receive a weather forecast, or any other type of communication common to a client server application architecture. In some embodiments, application request 202 originates from another of applications 116.

Figure 2B:
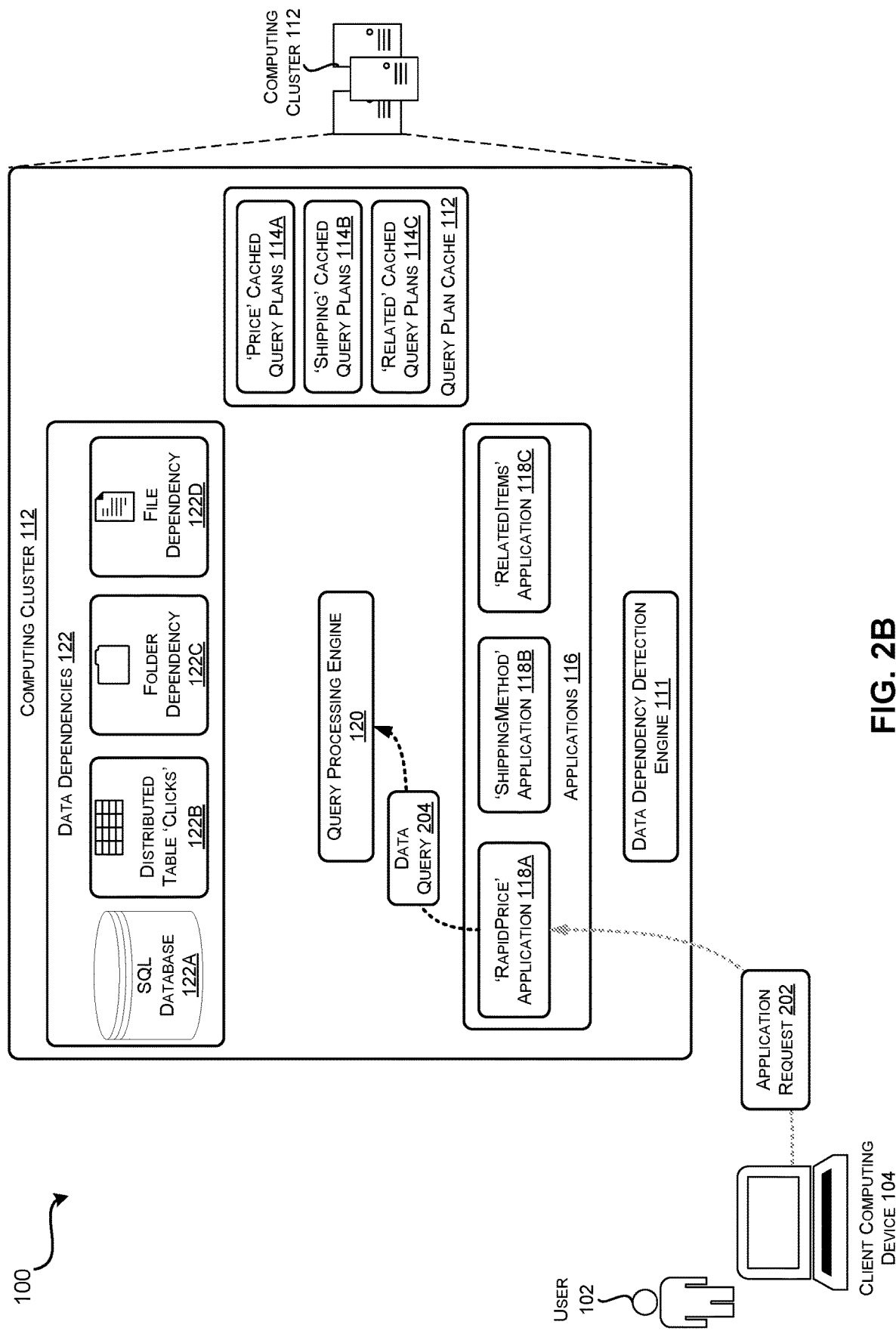
FIG. 2B is a system diagram illustrating an application sending a data query to a data query processing engine.

FIG. 2B is a system diagram 100 illustrating an application sending a data query to a data query processing engine. In some embodiments, in response to application request 202, application 118 a sends data query 204 to query processing engine 120. in other embodiments, application 118 periodically sends data query 204 to query processing engine 120, not in response to an application request 202. For example, application 118 may periodically retrieve weather information published as a data dependency.

Figure 2C:
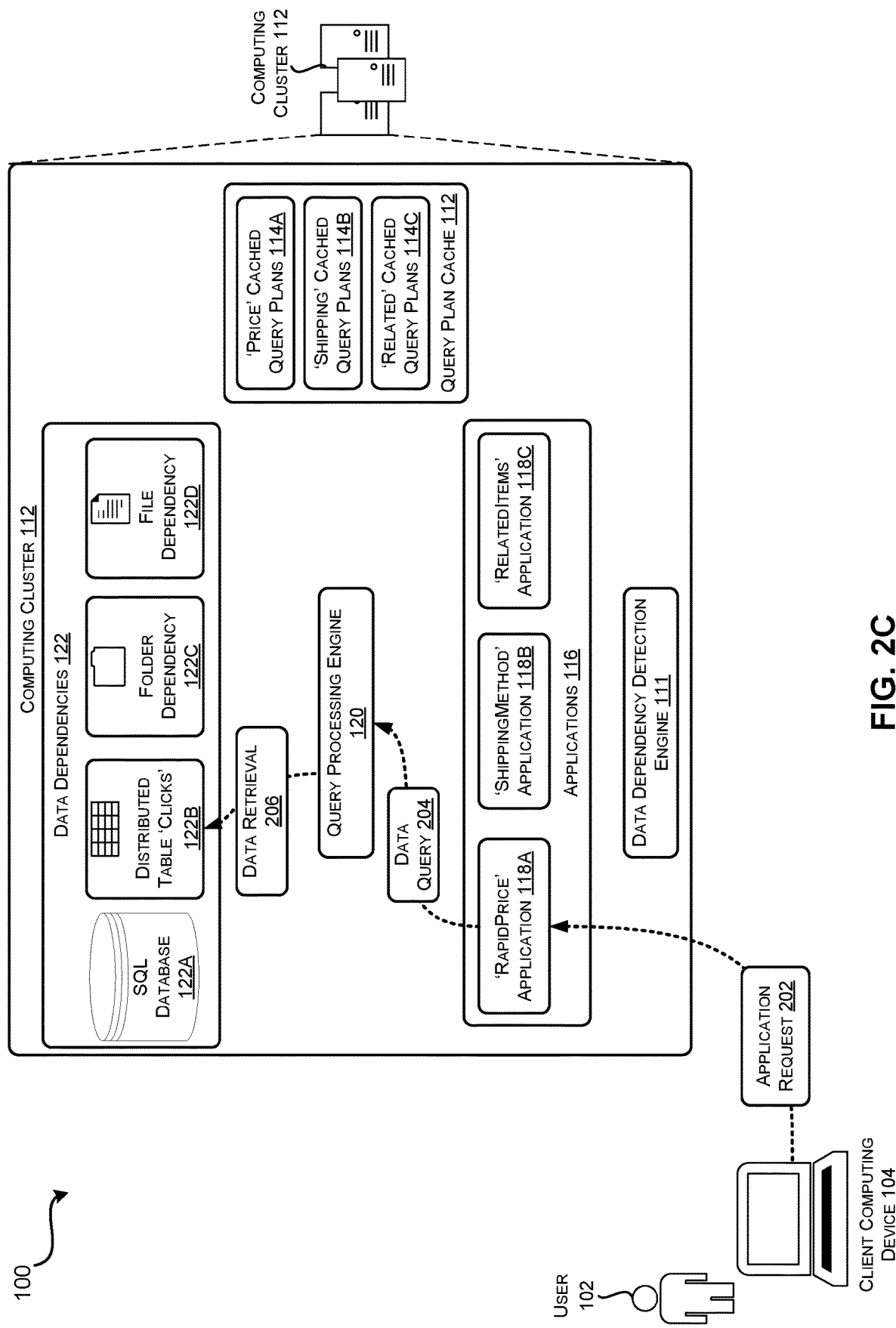
FIG. 2C is a system diagram illustrating a data retrieval request sent to a data dependency.

FIG. 2C is a system diagram 100 illustrating a data retrieval request sent to a data dependency. In some embodiments, query processing engine 120 submits data retrieval request 206 to one of data dependencies 122. Data retrieval request 206 may be generated based on a query plan 132, as discussed above in conjunction with FIG. 1. For example, the relation leaf-node of query plan 132 refers to a 'clicks' table, and so in response, query processing engine 120 generates a data retrieval request 206 to the 'clicks' table when executing data query 204.

Figure 2D:
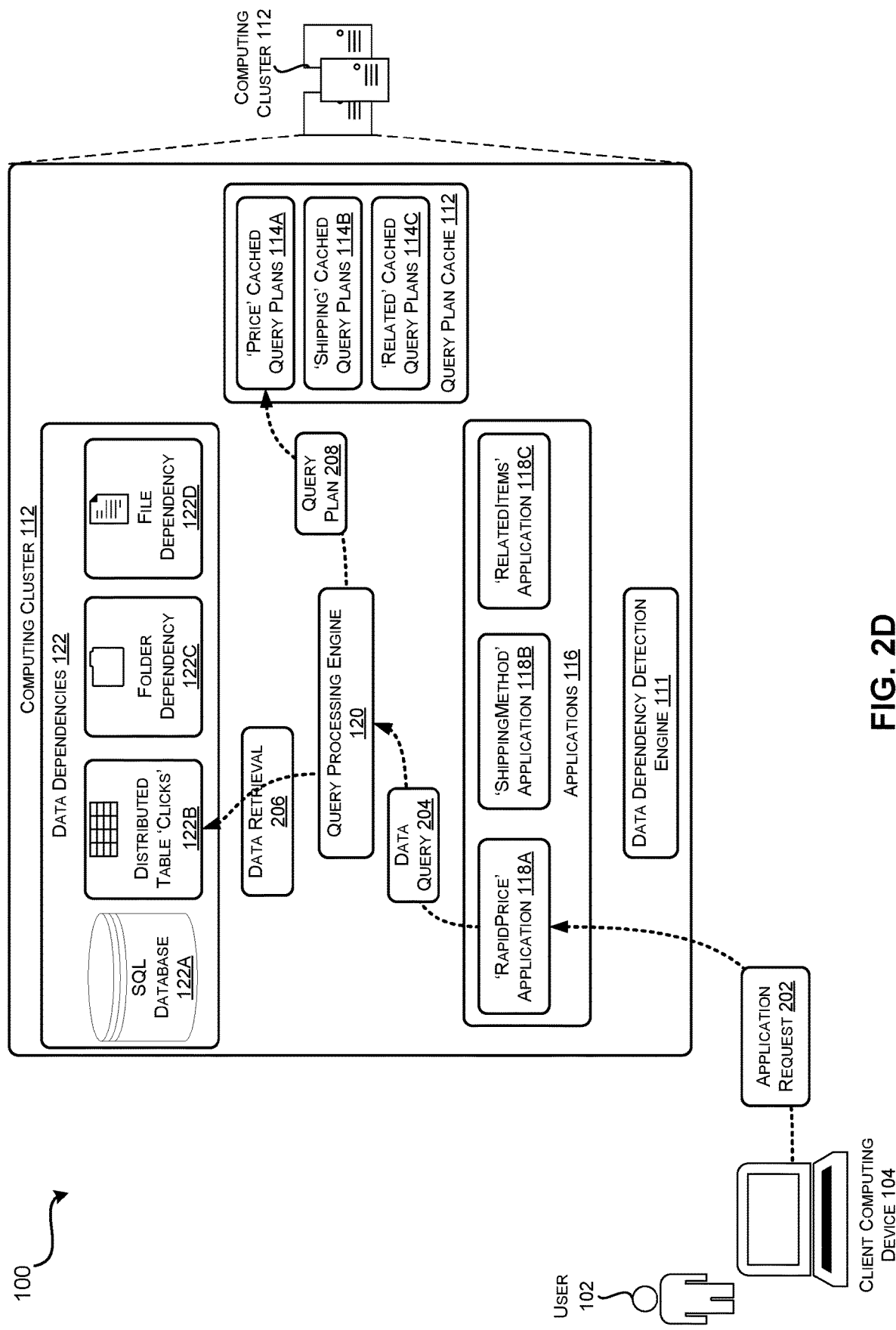
FIG. 2D is a system diagram illustrating a query plan being cached in query plan cache.

FIG. 2D is a system diagram 100 illustrating a query plan being cached in query plan cache. In some embodiments, query processing engine 120 stores query plan 208 in the cached query plans 114A of query plan cache 112. Query plan 208 may ordinarily be cached as a performance improvement, as data queries that map to the same hierarchy of commands can be received thousands if not millions of times. In some embodiments, query processing engine 120 saves every query plan 208 for the purpose of producing a complete and accurate record of data queries processed on behalf of a particular application.

Figure 3A:
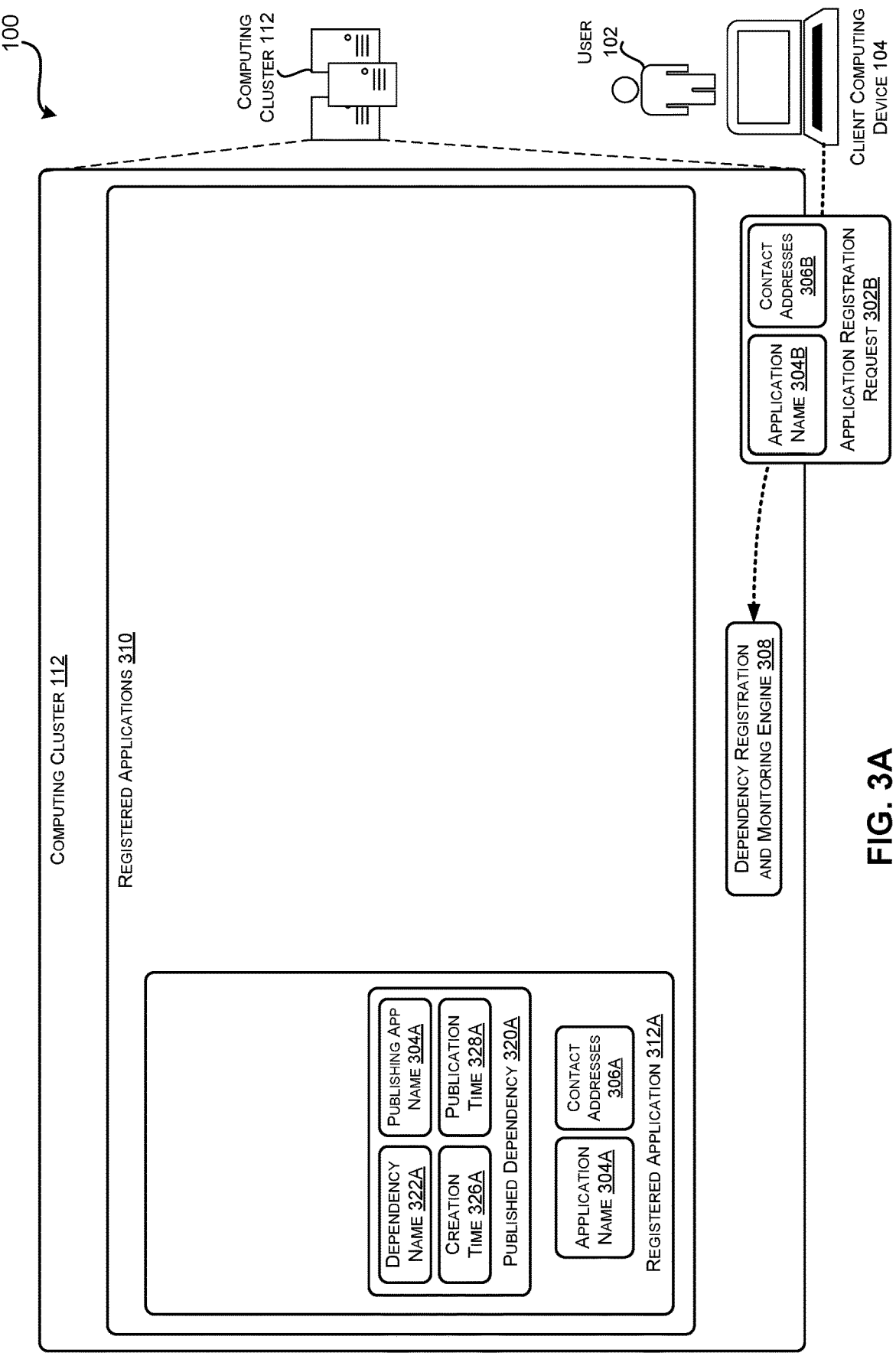
FIG. 3A is a system diagram illustrating an application registration request.

FIG. 3A is a system diagram 100 illustrating an application registration request. FIG. 3A depicts computing device 104 submitting application registration request 302B to dependency registration and monitoring engine 308. Application registration request 302B includes application name 304B and contact address is 306B. Application name 304B identifies which application the application registration requests 302B is registering. Contact address 306B may contain an email address, URL, Twitter handle, or other endpoint at which the administrator of the application may be contacted.

FIG. 3A also illustrates registered application 312A, which is one of registered applications 310. Registered application 312A includes application name 304A, contact addresses 306A, and published dependency 320A. Published dependency 320A may contain dependency name 322A, publishing app name 304A, creation time 326A, and publication time 328A.

Dependency registration and monitoring engine 308 enables applications to register themselves, register that they publish a data dependency to a defined location, as well as allowing consuming applications to register themselves and that they consume one of the published data dependencies.

Figure 3B:
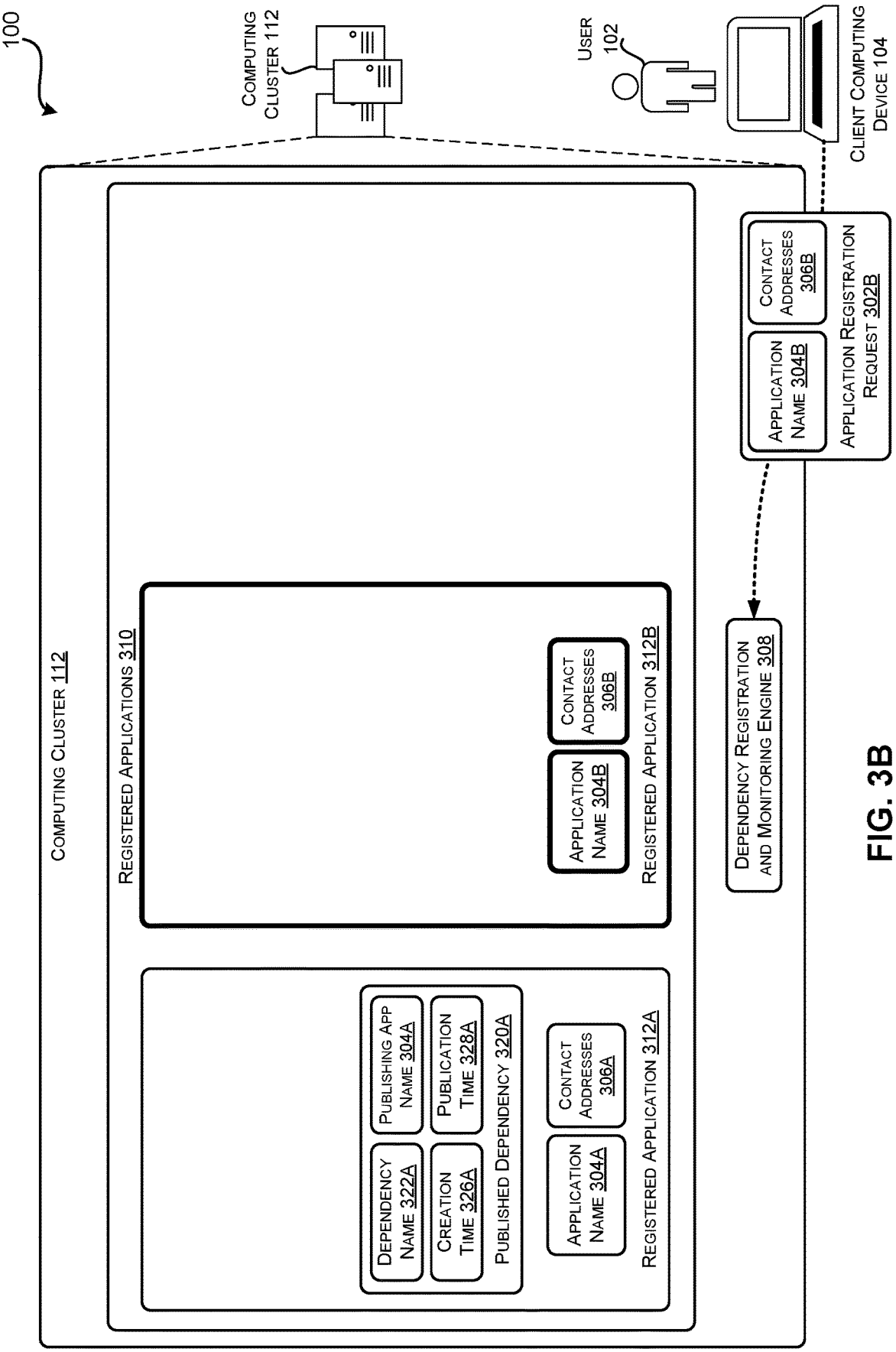
FIG. 3B is a system diagram illustrating a newly registered application.

FIG. 3B is a system diagram 100 illustrating a newly registered application. As a result of processing application registration request 302B, dependency registration and monitoring engine 308 created registered application 312B as one of the registered applications 310. Registered application 312B has application name 304B and contact addresses 306B as contained in the application registration request 302B.

Figure 3C:
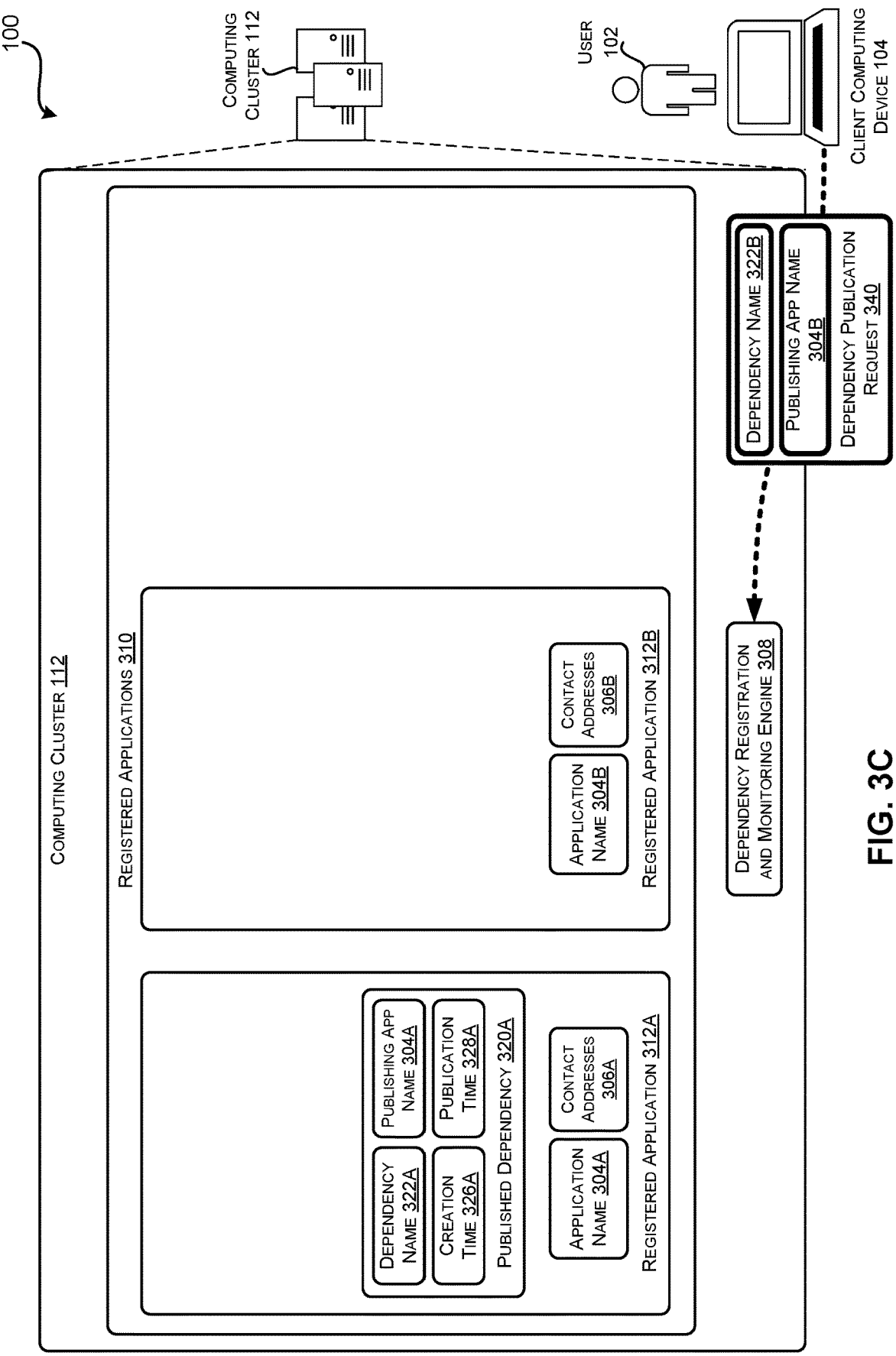
FIG. 3C is a system diagram illustrating a dependency publication request.

FIG. 3C is a system diagram 100 illustrating a dependency publication request. In some embodiments, client computing device 104 sends dependency publication request 340 to dependency registration and monitoring engine 308. Dependency publication request 340 includes dependency name 322B and publishing application name 304B. In this way, client computing device 104 registers that the application with the application name 304B publishes the data dependency named 322B. Although not illustrated in FIG. 3C, dependency publication request 340 may also include, optionally, creation time 326B and publication time 328B. Creation time 326B indicates when published dependency 320B was created, while publication time 328B indicates when registered application 312B is scheduled to publish the next iteration of the data dependency.

Figure 3D:
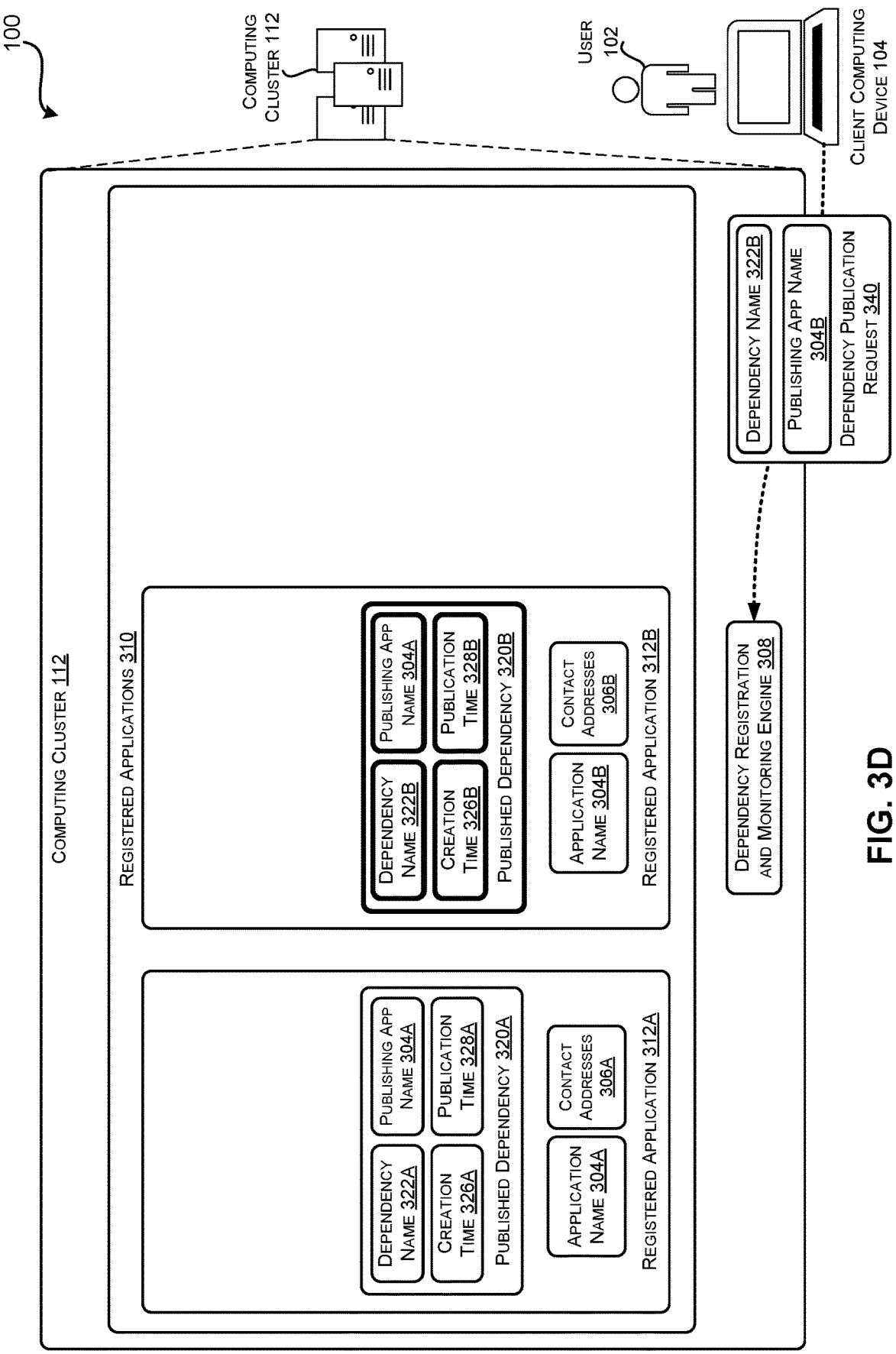
FIG. 3D is a system diagram illustrating a published dependency associated with a newly registered application.

FIG. 3D is a system diagram 100 illustrating a published dependency associated with a newly registered application. In some embodiments, published dependency 320B illustrates the publication of the dependency with the dependency name 322B by dependency registration and monitoring engine 308. As illustrated, the publication of this dependency is in response to receiving the dependencies publication request 340.

Figure 3E:
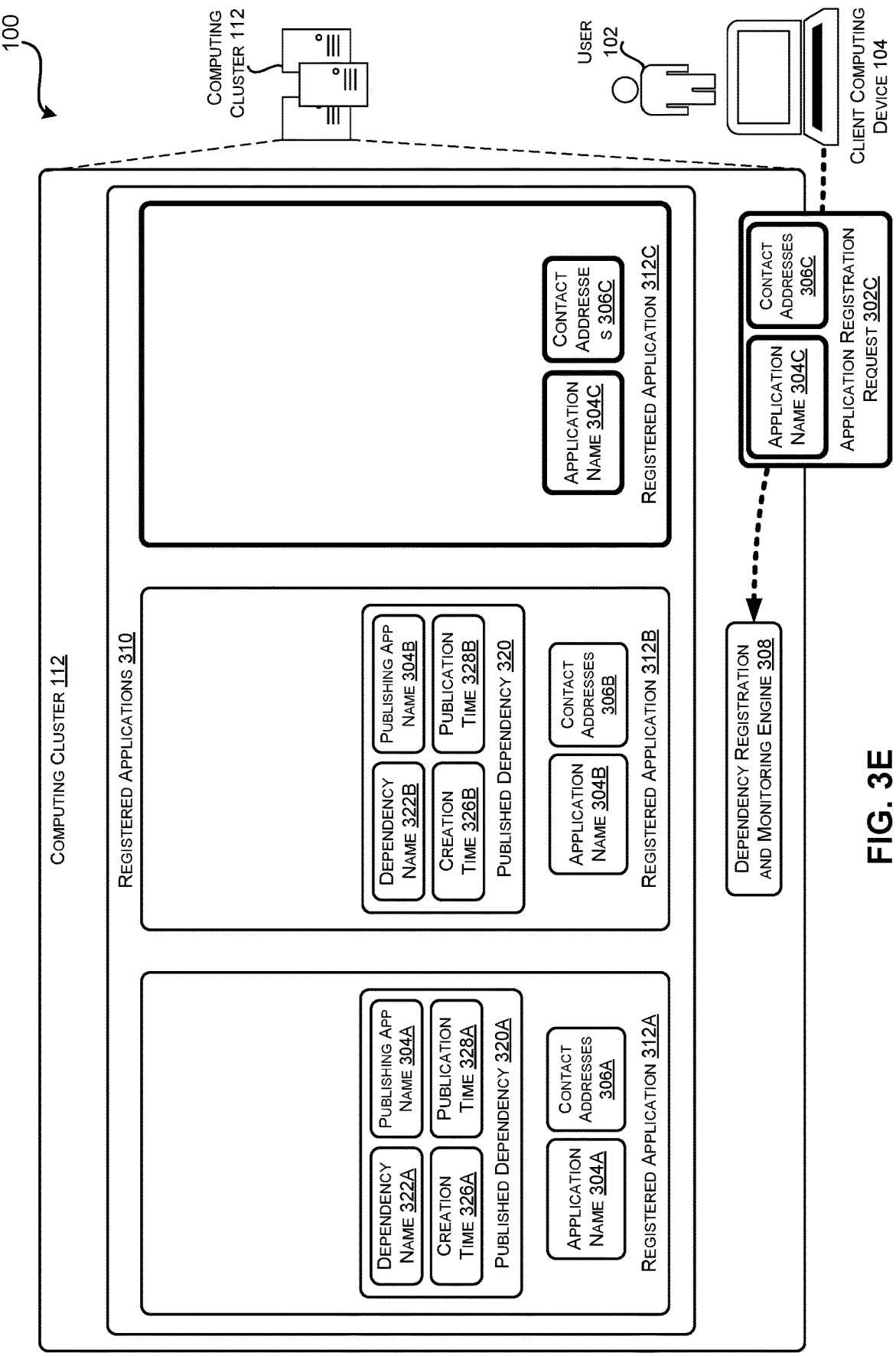
FIG. 3E is a system diagram illustrating another application registration request and associated registration of another application.

FIG. 3E is a system diagram 100 illustrating another application registration request and associated registration of another application. In some embodiments, application registration request 302C is transmitted from client computing device 104 to dependency registration and monitoring engine 308. In response, dependency registration and monitoring engine 308 generates registered application 312C as one of the registered applications 310. Registered application 312C includes application name 304C and contact addresses 306C, similar to registered application 312B as discussed above in conjunction with FIG. 3B.

Figure 3F:
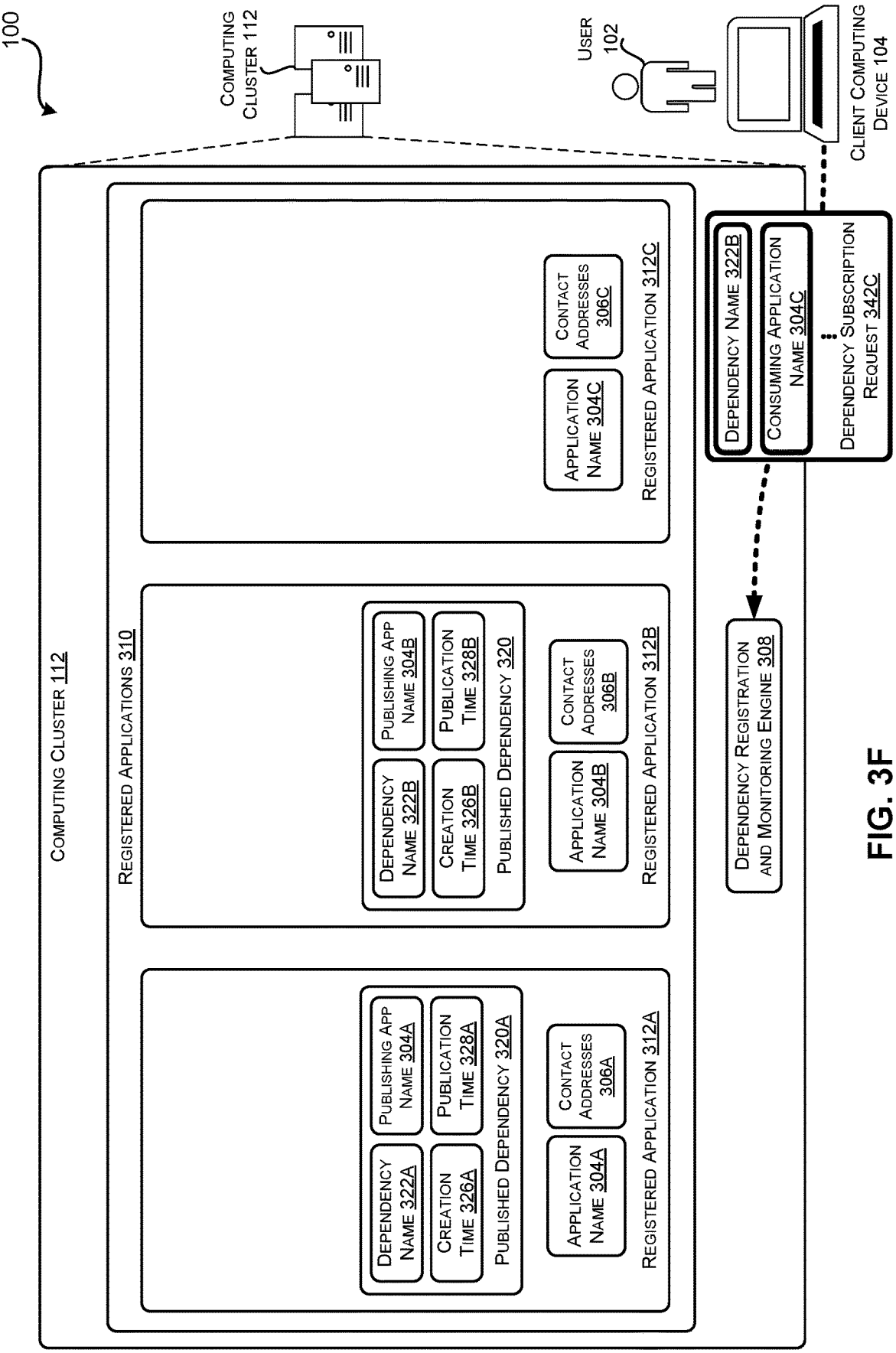
FIG. 3F is a system diagram illustrating a dependency subscription request.

FIG. 3F is a system diagram 100 illustrating a dependency subscription request. In some configurations, dependency subscription request 342C is transmitted from client computing device 104 to dependency registration and monitoring engine 308. Dependency subscription request 342C includes dependency name 322B and consuming application name 304C. Dependency registration and monitoring engine 308A may then add a new data dependency from the application 312C (having the consuming application name 304C) to the published dependency 320 (having the dependency name 322B).

Figure 3G:
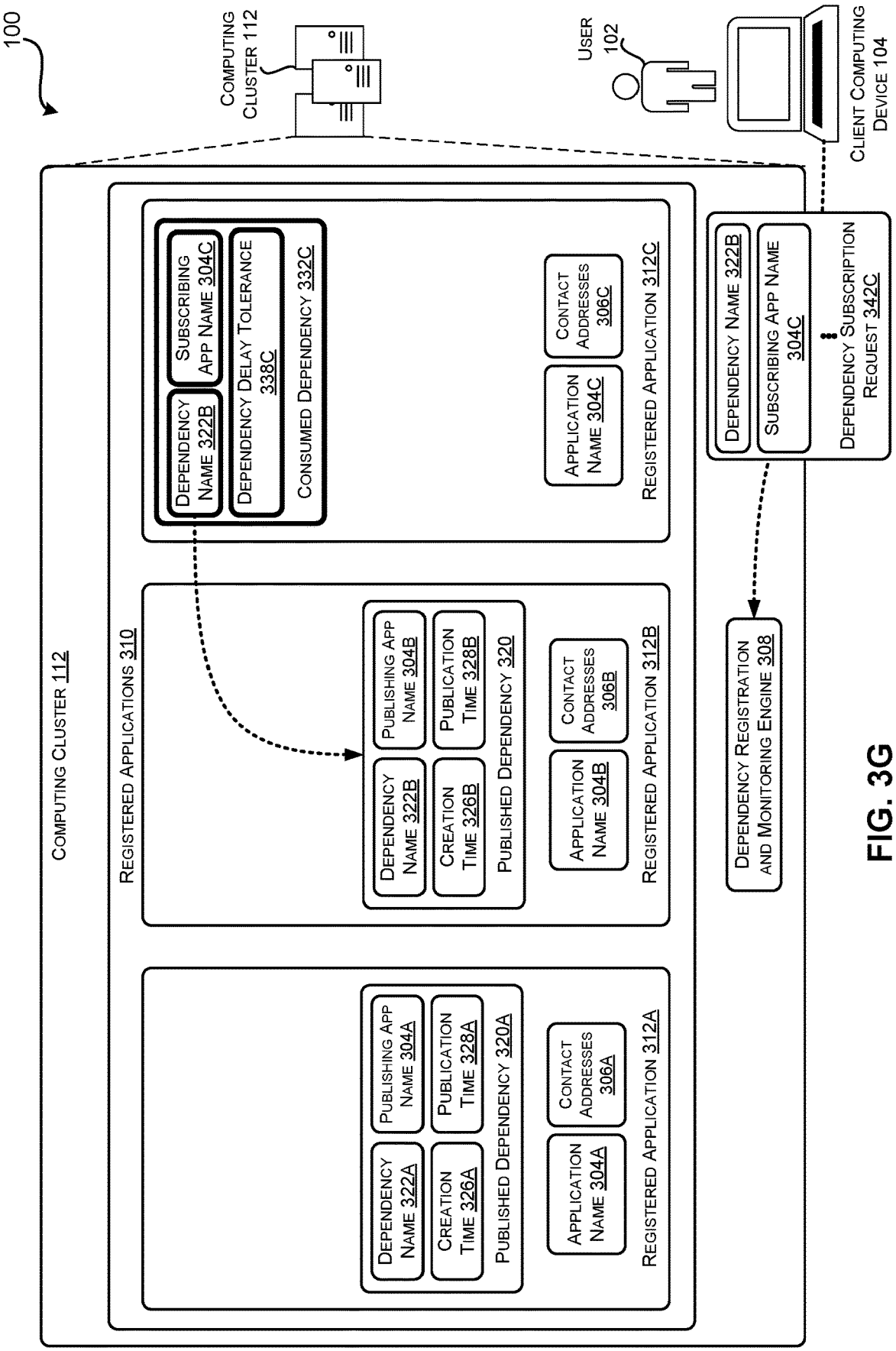
FIG. 3G is a system diagram illustrating a dependency subscription from one registered application to another.

FIG. 3G is a system diagram 100 illustrating a dependency subscription from registered application 312C to the published dependency 320 of registered application 312B. In this way, registered application 312B acts a providing application. When application 312B publishes data to published dependency 320, registered application 312C will receive a notification that the publication has happened.

Figure 3H:
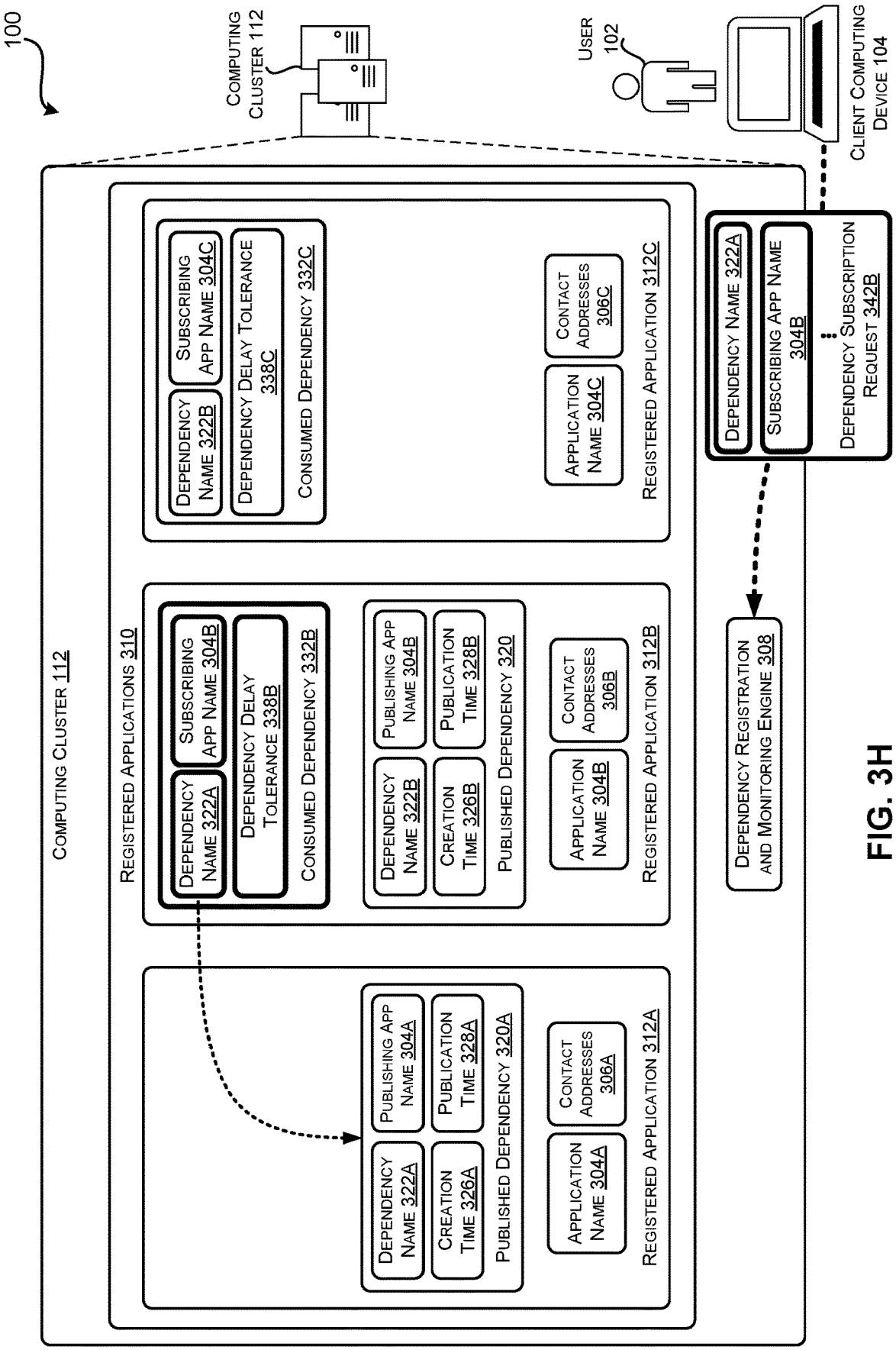
FIG. 3H is a system diagram illustrating a second dependency subscription request and the corresponding subscription from one registered application to another.

FIG. 3H is a system diagram 100 illustrating a second dependency subscription request and the corresponding subscription from one registered application to another. Dependency subscription request 342B contains dependency name 322A and subscribing application name 304B, and is transmitted from client computing device 104 to dependency registration and monitoring engine 308. As a result, dependency registration and monitoring engine 308 adds consumed dependency 322B to registered application 312B. Consumed dependency 332B includes dependency name 322A and subscribing application name 304B. In addition, consumed dependency 332B includes dependency delay tolerance 338B, which indicates how long a consumer of published dependency 320A is willing to wait beyond publication time 328A before alerting user 102 via contact addresses 306B.

Figure 3I:
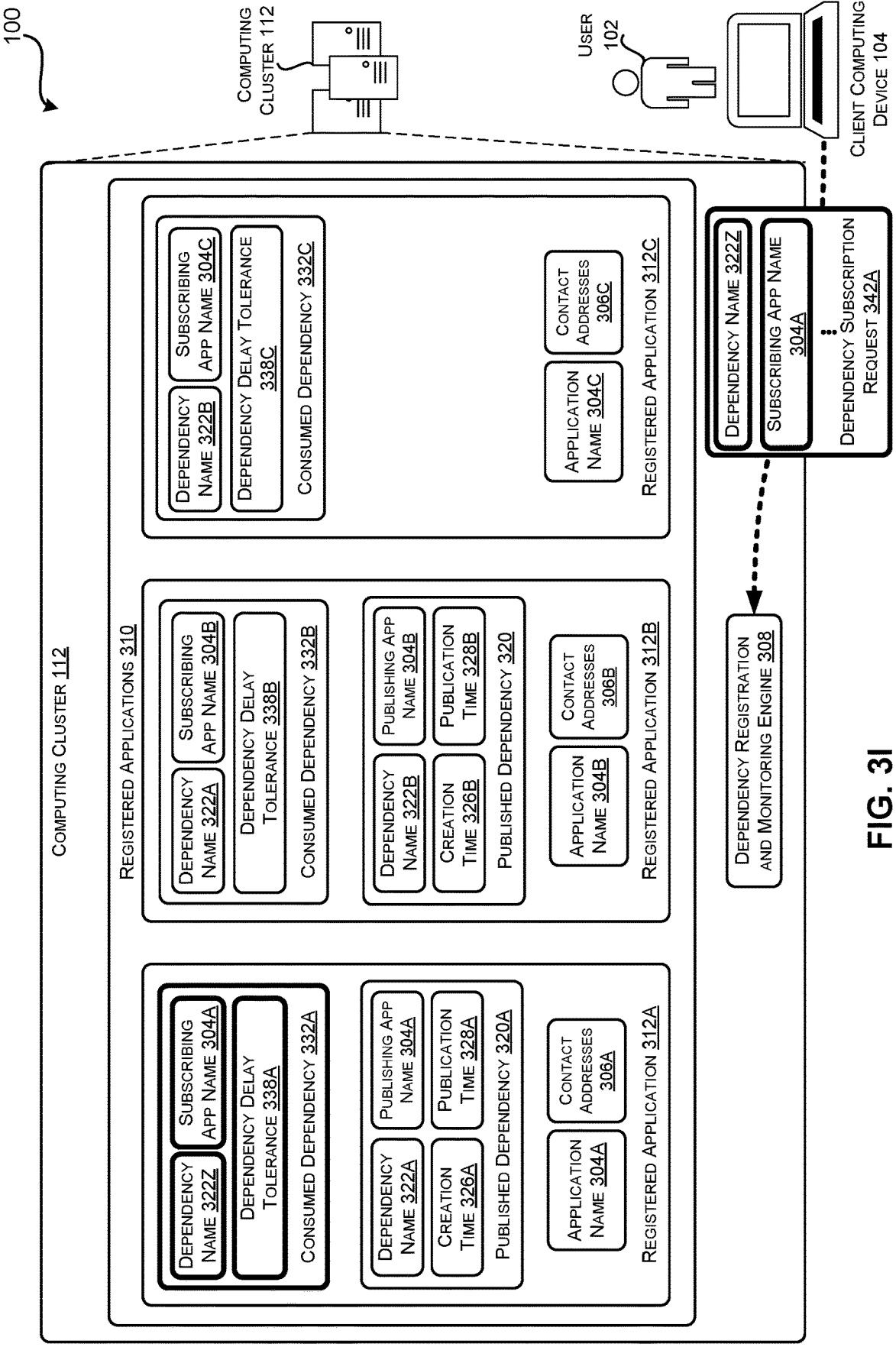
FIG. 3I is a system diagram illustrating a third dependency subscription request.

FIG. 3I is a system diagram 100 illustrating a third dependency subscription request. Dependency subscription request 342A contains dependency name 322Z and subscribing application name 304A. Dependency subscription request 342A is transmitted from client computing device 104 to dependency registration and monitoring engine 308. In response, dependency registration and monitoring engine creates consumed dependency 332A as part of registered application 312A. Consumed dependency 332A may include the dependency name 322Z, the subscribing application name 304, and a dependency delay tolerance 338A.

Figure 3J:
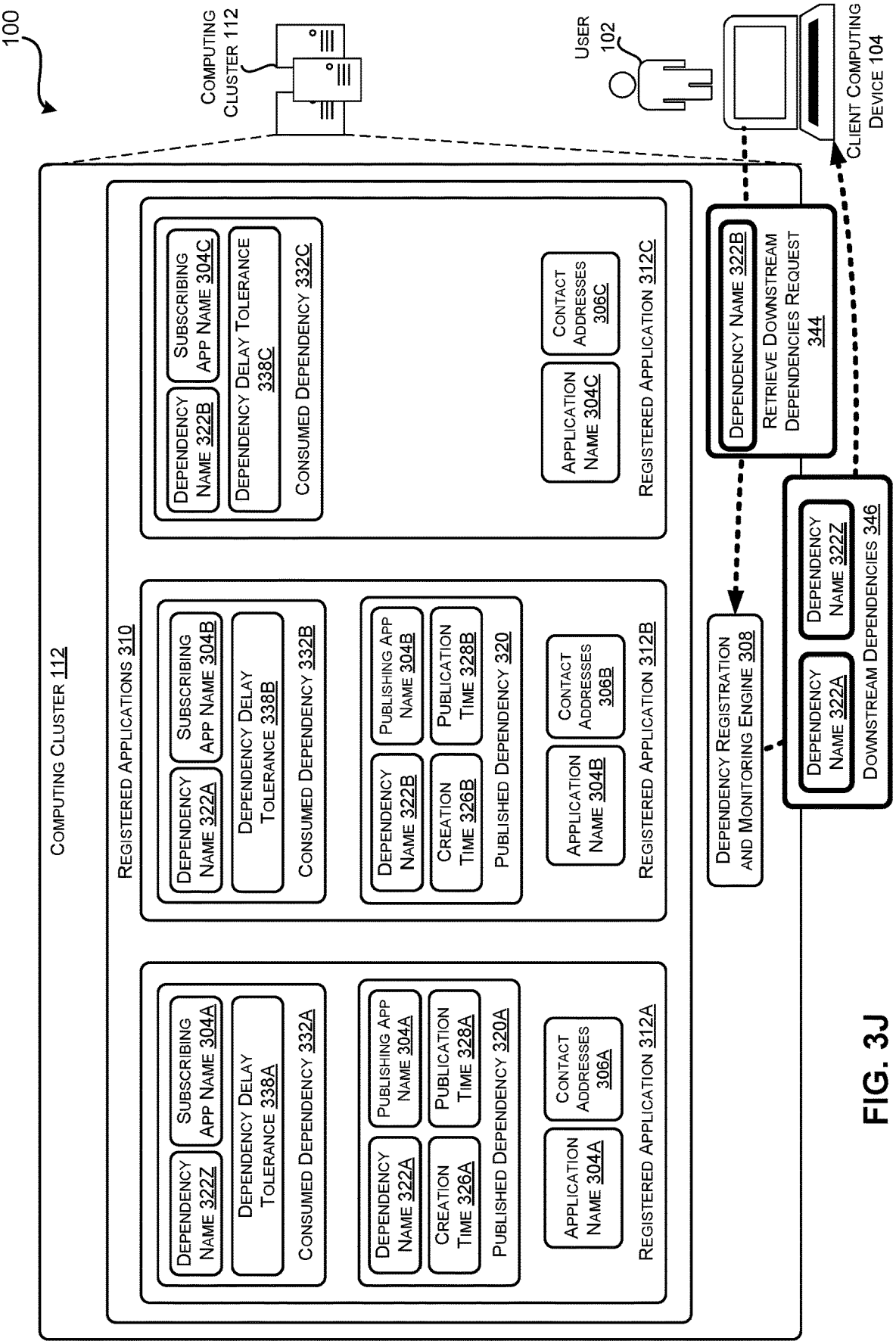
FIG. 3J is a system diagram illustrating a downstream dependencies request.

FIG. 3J is a system diagram 100 illustrating a downstream dependencies request. In some embodiments, the retrieve downstream dependencies request 344 is transmitted from client computing device 104 to dependency registration and monitoring engine 308. Retrieve downstream dependencies request 344 may contain dependency name 332B, which in this illustration is the name of a dependency published by registered application 312B. In response to receiving the request 344, dependency registration and monitoring engine 308 analyzes the data dependencies consumed by the dependency named 322B, as well as any downstream dependencies. For example, dependency registration and monitoring engine 308 may determine, based on the dependency name 322B field of the retrieve downstream dependencies request 344, that registered application 312B depends on a data dependency published by registered application 312A. Once registered application 312A has been identified as a dependency, downstream dependencies are identified. For example, a consumed dependency 332A of a registered application 312A may be analyzed to identify the downstream data dependency having the dependency name 322Z. Any data dependencies of the registered application associated with the published dependency named 322Z may also be identified in downstream dependencies 346. Once the downstream dependencies 346 have been identified, e.g. dependency names 322A and 322Z, downstream dependencies 346 is returned to the client computing device 104.

Figure 3K:
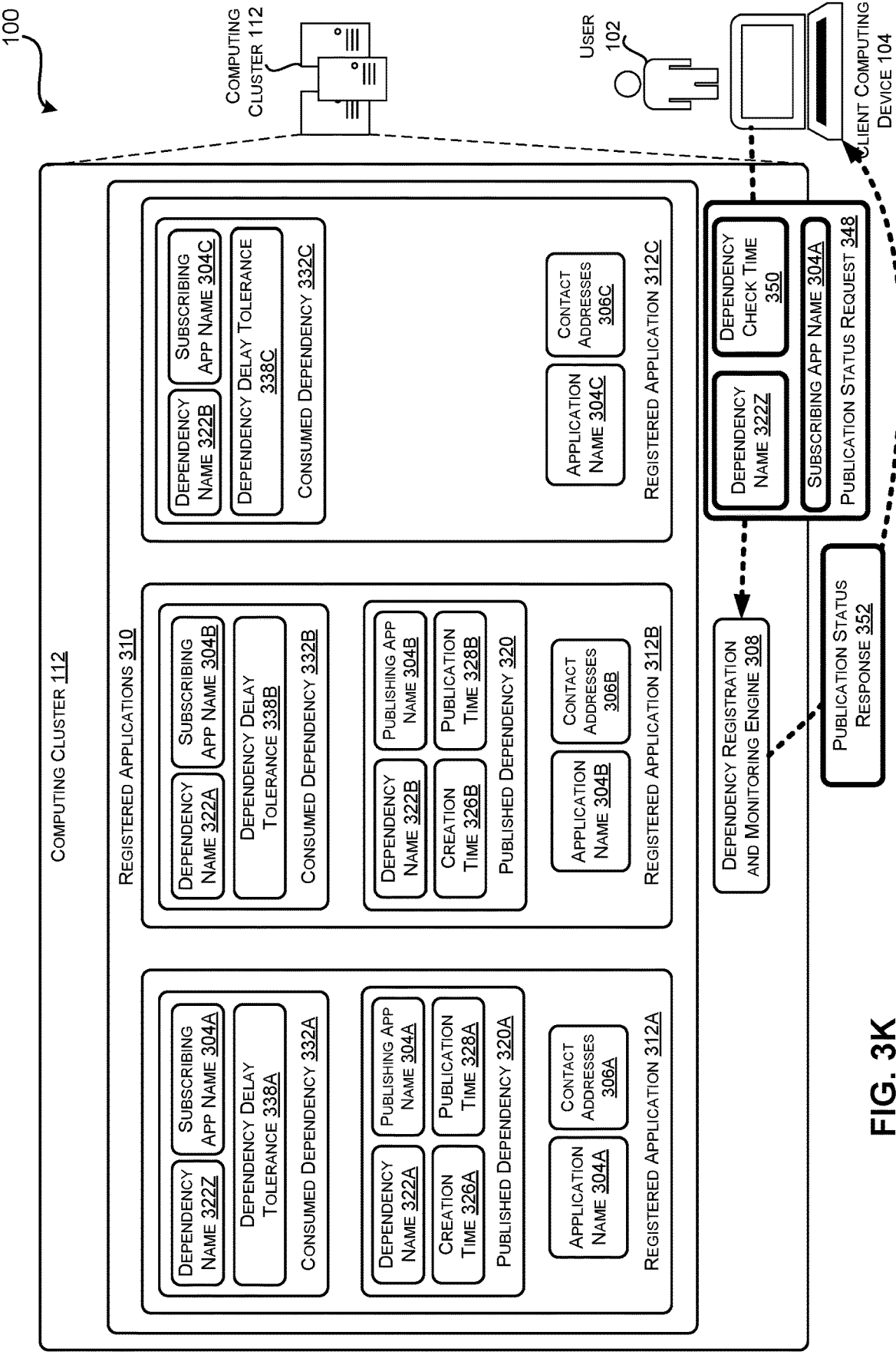
FIG. 3K is a system diagram illustrating a publication status request.

FIG. 3K is a system diagram 100 illustrating a publication status request. In some embodiments, publication status request 348 is transmitted from client computing device 104 to dependency registration and monitoring engine 308. Publication status request 348 includes dependency name 322Z, subscribing application name 304A, and dependency check time 350. In response, dependency registration and monitoring engine 308A returns publication status response 352, which indicates the data dependency with the dependency name 322Z has published the data it was scheduled to have published.

Figure 3L:
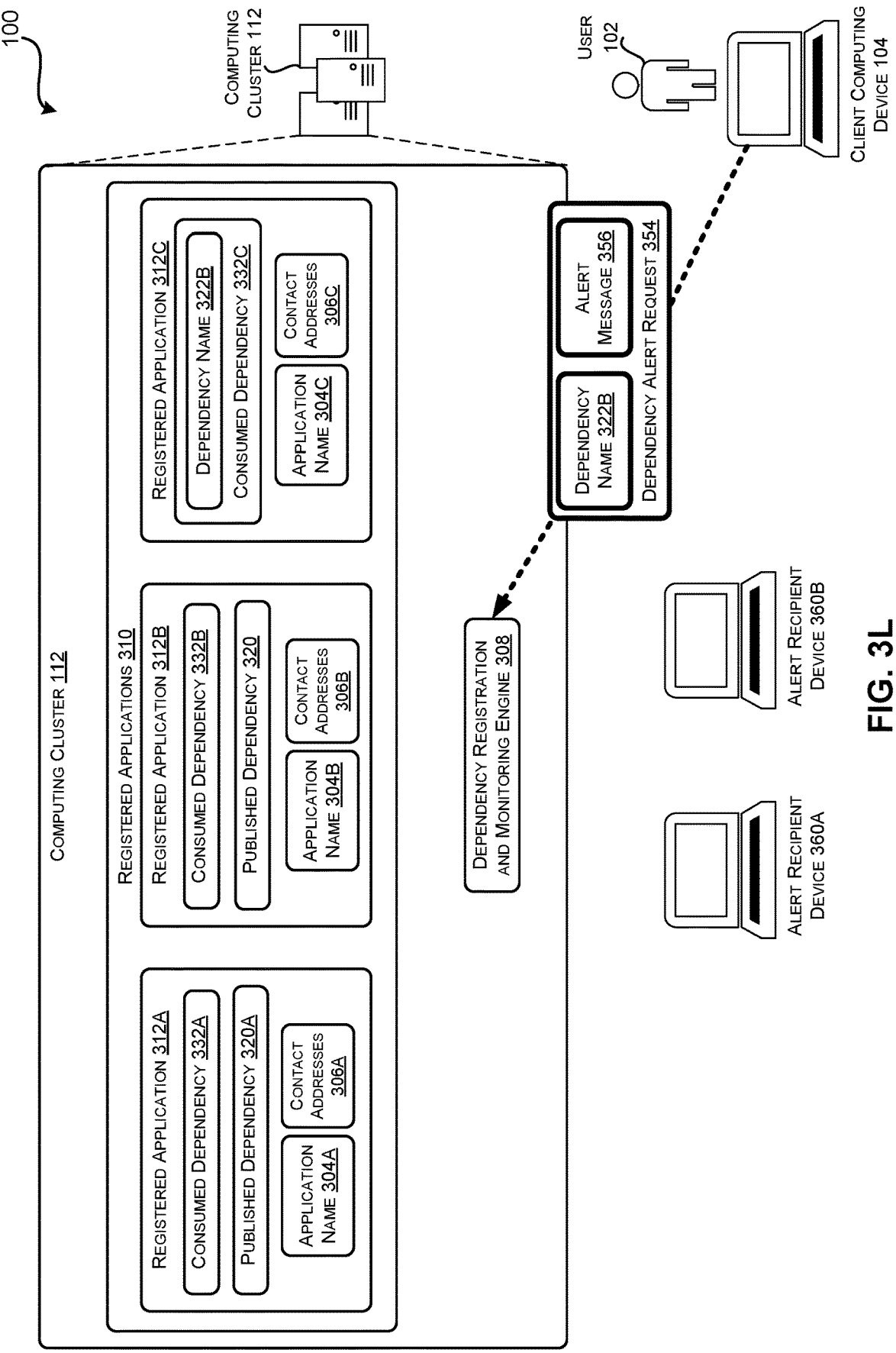
FIG. 3L is a system diagram illustrating a dependency alert request submitted to a dependency registration and monitoring engine.

FIG. 3L is a system diagram 100 illustrating a dependency alert request submitted to a dependency registration and monitoring engine. In some embodiments, dependency alert request 354 is transmitted from client computing device 104 to dependency registration and monitoring engine 308. Dependency alert request 354 includes dependency name 322B and alert message 356. Dependency name 322B is the name of a dependency that the independency registration and monitoring engine 308 will monitor.

Figure 3M:
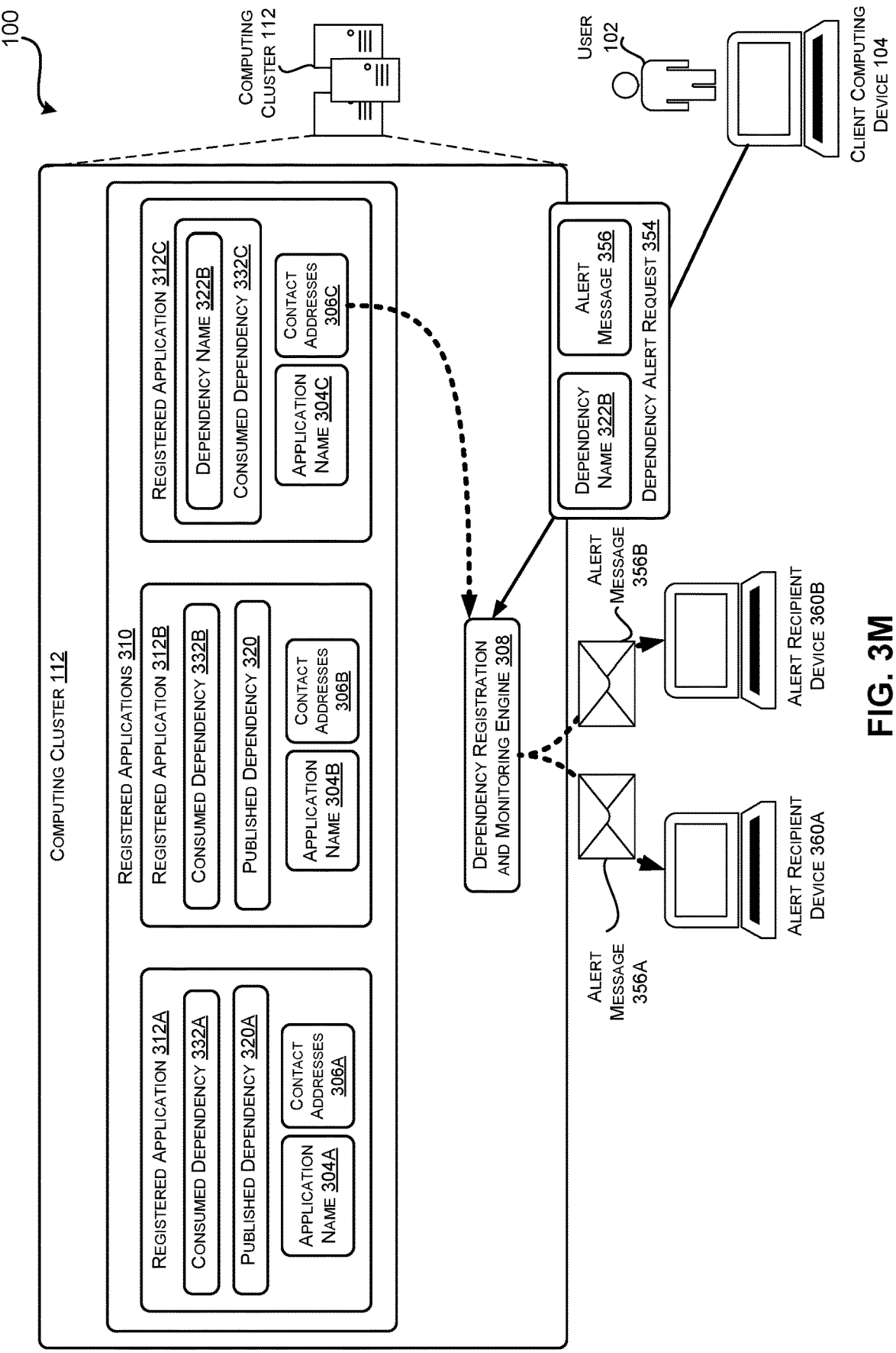
FIG. 3M is a system diagram illustrating alert messages being sent in response to detecting publication of a dependency.

FIG. 3M is a system diagram 100 illustrating alert messages being sent in response to detecting publication of a dependency. In some configurations, dependency registration and monitoring engine 308 transmit alert message 356 to one or more of contact addressees 306.

Figures 4A, 4B, 4C:
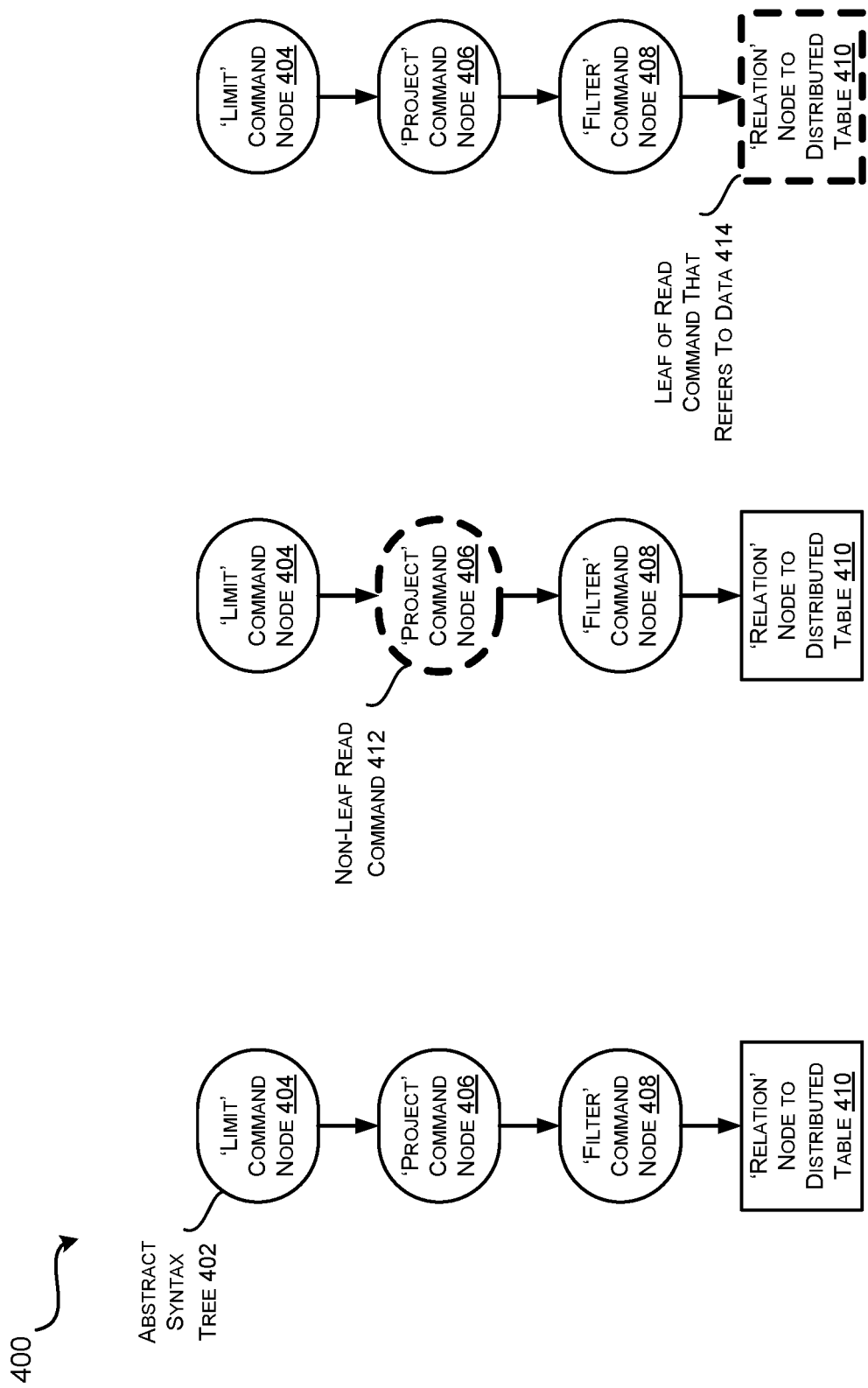
FIG. 4A is a block diagram illustrating an abstract syntax tree representation of a query plan.
FIG. 4B is a block diagram illustrating a non-leaf command node of an abstract syntax tree.
FIG. 4C is a block diagram illustrating a leaf node that includes a data dependency identifier.

FIG. 4A is a block diagram 400 illustrating an abstract syntax tree representation of a query plan. In some embodiments, abstract syntax tree 402 is generated by query processing engine 120 while executing a data query 204. Once a query plan has been generated for a data query 204 of a particular structure—i.e. having a particular abstract syntax tree 402, the query plan may be reused for any data query with the same structure. Continuing the example discussed above in conjunction with FIG. 1, abstract syntax tree 402 includes limit command node 404 representing the "limit 1000" expression, project command node 406 representing the "select" expression, filter command node 408 representing the "where" expression, and relation node to distributed table 410 representing the "mrkt_data.geo_perf_rpt" expression of the query "select avg(clicks) from mrkt_data.geo_perf_rpt where dt>"2019-10-10" limit 1000;".

FIG. 4B is a block diagram 400 illustrating a non-leaf command node 412 of an abstract syntax tree. In this example, the non-leaf node is a read command, specifically a 'project' command. As discussed above, a 'project' command may be used to modify data returned by 'relation' node 410 and filtered by the filter command node 408. Leaf nodes that descend from a read command are interpreted as data dependencies that are consumed by the application associated with the query plan.

FIG. 4C is a block diagram 400 illustrating a leaf node 414 that includes a data dependency identifier. In some embodiments, one or more data dependency identifiers are extracted from the leaf node 414 by retrieving metadata associated with the leaf node. The metadata may include database and table names, file and folder names, clustered storage system names, cloud-based data service names, etc. For example, when the query plan refers to a Hive table, the relation node 414 may be associated with a 'HiveTableRelation' object, which may refer to a 'CatalogTable' object, which includes one or more fields that contain a table identifier. The identified table is the consumed data dependency.

Figure 5:
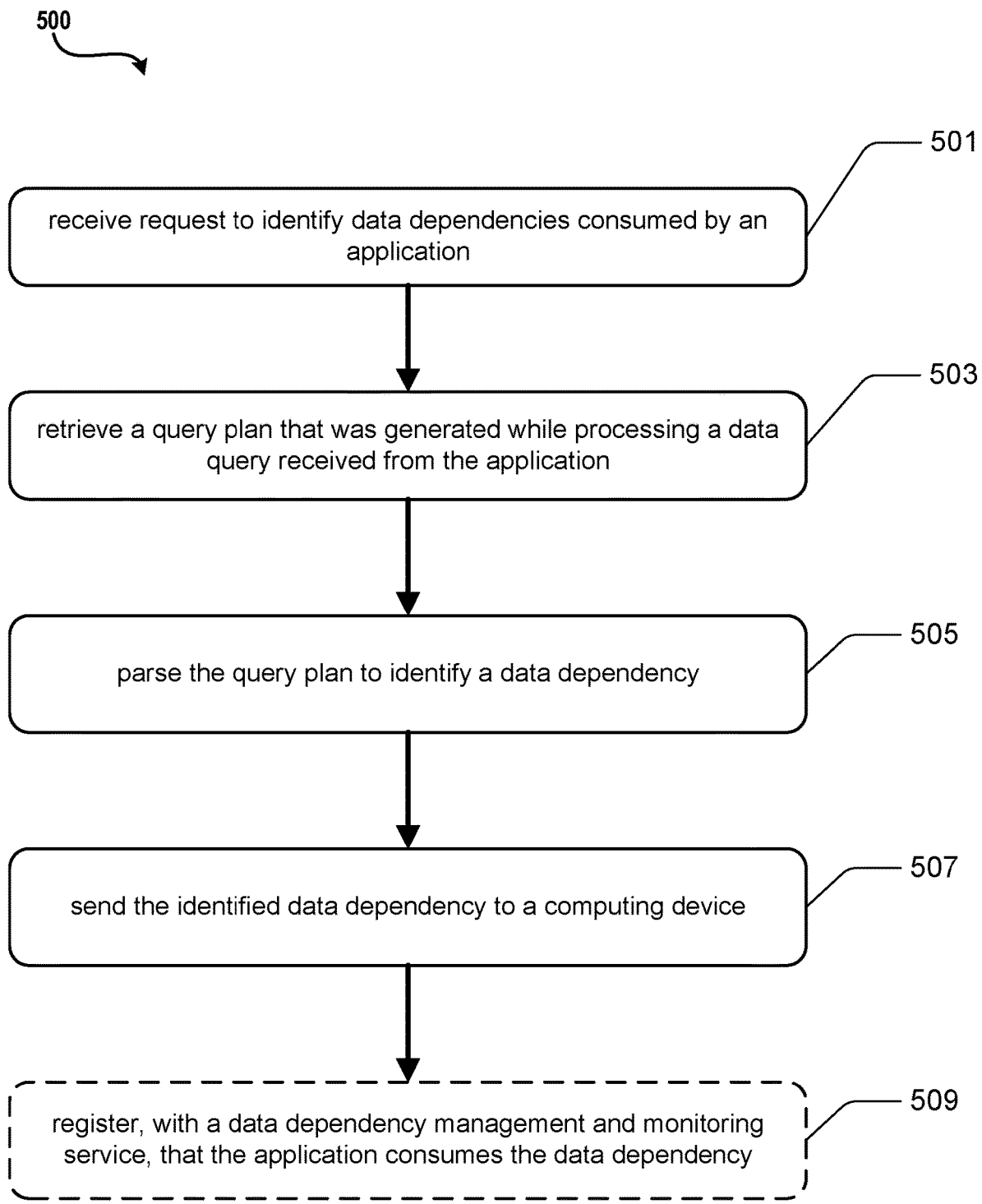
FIG. 5 is a flow diagram showing aspects of an illustrative routine, according to one embodiment disclosed herein.

FIG. 5 is a flow diagram illustrating aspects of a routine 500 for implementing some of the techniques disclosed herein. It should be understood by those of ordinary skill in the art that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, performed together, and/or performed simultaneously, without departing from the scope of the appended claims.

It should also be understood that the illustrated methods can end at any time and need not be performed in their entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like. Although the example routine described below is operating on a computing device, it can be appreciated that this routine can be performed on any computing system which may include a number of computers working in concert to perform the operations disclosed herein.

Thus, it should be appreciated that the logical operations described herein are implemented (1) as a sequence of computer implemented acts or program modules running on a computing system such as those described herein) and/or (2) as interconnected machine logic circuits or circuit modules within the computing system. The implementation is a matter of choice dependent on the performance and other requirements of the computing system. Accordingly, the logical operations may be implemented in software, in firmware, in special purpose digital logic, and any combination thereof.

The routine 500 begins at operation 501, which illustrates receiving a request 106 to identify data dependencies 122 consumed by an application 118, as discussed above in conjunction with FIG. 1. For illustrative purposes, a data dependency is consumed by an application can mean The routine 500 then proceeds to operation 503, which illustrates retrieving a query plan 132 that was generated while processing a data query 204 received from the application 118. Operation 503 may be performed by data dependency detection engine 111, as discussed above in conjunction with FIG. 1.

The routine 500 then proceeds to operation 505, which illustrates parsing the query plan 132 to identify a data dependency 114. Operation 505 may be performed by data dependency detection engine 111, as discussed above in conjunction with FIG. 1.

The routine 500 then proceeds to operation 507, which illustrates sending the identified data dependency 135 to a computing device. Operation 505 may be performed by data dependency detection engine 111, as discussed above in conjunction with FIG. 1.

The routine 500 then optionally proceeds to operation 509, which illustrates registering, with a data dependency management and monitoring service, that the application 118 consumes the data dependency 132. Operation 509 may be performed by dependency registration and monitoring engine 308, as discussed above in conjunction with FIG. 3A.

Figure 6:
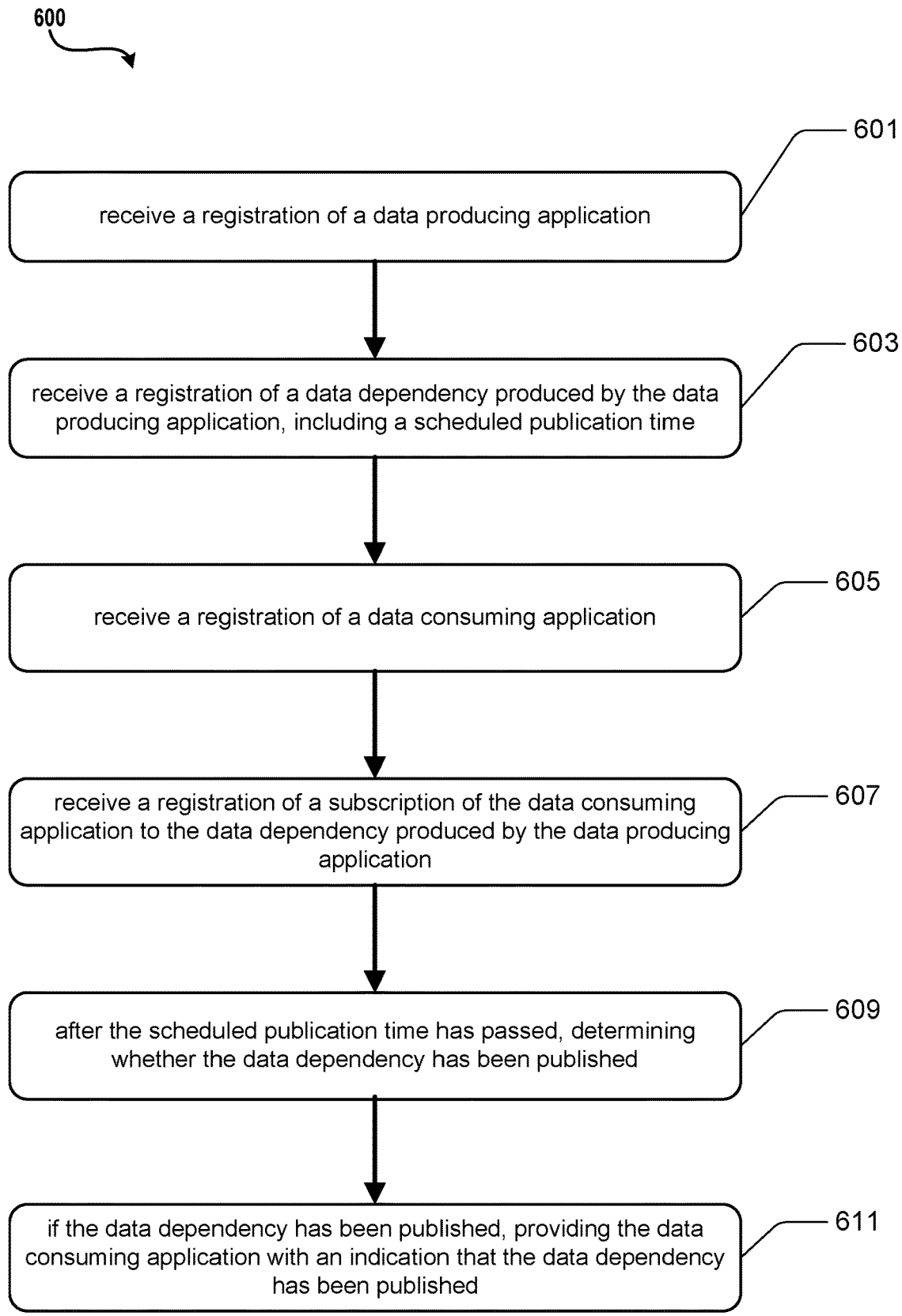
FIG. 6 is a flow diagram showing aspects of an illustrative routine, according to one embodiment disclosed herein.

FIG. 6 is a diagram illustrating aspects of a routine 600 for implementing some of the techniques disclosed herein. The routine 600 begins at operation 601, which illustrates receiving a registration 302B of a data producing application 312B. The routine 600 then proceeds to operation 603, which illustrates receiving a registration 340 of a data dependency 320 produced by the data producing application 312B, including a scheduled publication time 328B.

The routine 600 then proceeds to operation 605, which illustrates receiving a registration 302C of a data consuming application 312C.

The routine 600 then proceeds to operation 607, which illustrates receiving a registration of a subscription 342C of the data consuming application 312C to the data dependency 320 produced by the data producing application 312B.

The routine 600 then proceeds to operation 609, which illustrates, after the scheduled publication time 328B has passed, determining whether the data dependency 320 has been published.

The routine 600 then proceeds to operation 611, which illustrates if the data dependency 320 has been published, providing the data consuming application 312C with an indication that the data dependency 320 has been published.

Figure 7:
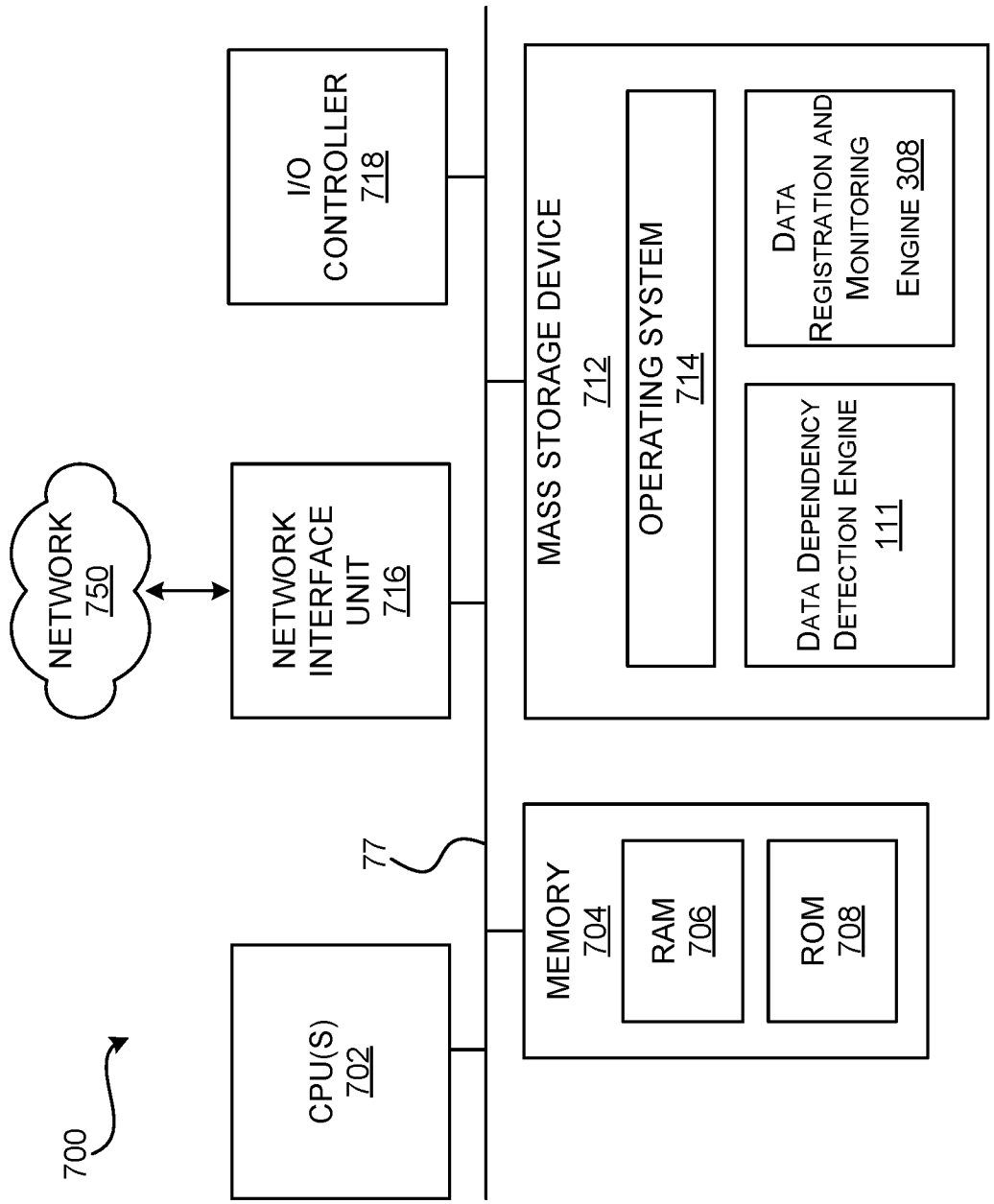
FIG. 7 is a computer architecture diagram illustrating aspects of an example computer architecture for a computer capable of executing the software components described herein.

FIG. 7 shows an example computer architecture for a computer capable of providing the functionality described herein such as, for example, a computing device configured to implement the functionality described above with reference to FIGS. 1-6. Thus, the computer architecture 700 illustrated in FIG. 7 illustrates an architecture for a server computer or another type of computing device suitable for implementing the functionality described herein. The computer architecture 700 might be utilized to execute the various software components presented herein to implement the disclosed technologies.

The computer architecture 700 illustrated in FIG. 7 includes a central processing unit 702 ("CPU"), a system memory 704, including a random-access memory 706 ("RAM") and a read-only memory ("ROM") 708, and a system bus 77 that couples the memory 704 to the CPU 702. A firmware containing basic routines that help to transfer information between elements within the computer architecture 700, such as during startup, is stored in the ROM 708. The computer architecture 700 further includes a mass storage device 712 for storing an operating system 714, other data, and one or more executable programs, such as Data Dependency Detection Engine 111 and Data Registration and Monitoring Engine 308.

The mass storage device 712 is connected to the CPU 702 through a mass storage controller (not shown) connected to the bus 77. The mass storage device 712 and its associated computer-readable media provide non-volatile storage for the computer architecture 700. Although the description of computer-readable media contained herein refers to a mass storage device, such as a solid-state drive, a hard disk or optical drive, it should be appreciated by those skilled in the art that computer-readable media can be any available computer storage media or communication media that can be accessed by the computer architecture 700.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, radio frequency, infrared and other wireless media. Combinations of the any of the above should also be included within the scope of computer-readable media.

By way of example, and not limitation, computer-readable storage media might include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer architecture 700. For purposes of the claims, the phrase "computer storage medium," "computer-readable storage medium" and variations thereof, does not include waves, signals, and/or other transitory and/or intangible communication media, per se.

According to various implementations, the computer architecture 700 might operate in a networked environment using logical connections to remote computers through a network 750 and/or another network (not shown). A computing device implementing the computer architecture 700 might connect to the network 750 through a network interface unit 716 connected to the bus 77. It should be appreciated that the network interface unit 716 might also be utilized to connect to other types of networks and remote computer systems.

The computer architecture 700 might also include an input/output controller 718 for receiving and processing input from a number of other devices, including a keyboard, mouse, or electronic stylus (not shown in FIG. 7). Similarly, the input/output controller 718 might provide output to a display screen, a printer, or other type of output device (also not shown in FIG. 7).

It should be appreciated that the software components described herein might, when loaded into the CPU 702 and executed, transform the CPU 702 and the overall computer architecture 700 from a general-purpose computing system into a special-purpose computing system customized to facilitate the functionality presented herein. The CPU 702 might be constructed from any number of transistors or other discrete circuit elements, which might individually or collectively assume any number of states. More specifically, the CPU 702 might operate as a finite-state machine, in response to executable instructions contained within the software modules disclosed herein. These computer-executable instructions might transform the CPU 702 by specifying how the CPU 702 transitions between states, thereby transforming the transistors or other discrete hardware elements constituting the CPU 702.

Encoding the software modules presented herein might also transform the physical structure of the computer-readable media presented herein. The specific transformation of physical structure might depend on various factors, in different implementations of this description. Examples of such factors might include, but are not limited to, the technology used to implement the computer-readable media, whether the computer-readable media is characterized as primary or secondary storage, and the like. If the computer-readable media is implemented as semiconductor-based memory, the software disclosed herein might be encoded on the computer-readable media by transforming the physical state of the semiconductor memory. For example, the software might transform the state of transistors, capacitors, or other discrete circuit elements constituting the semiconductor memory. The software might also transform the physical state of such components in order to store data thereupon.

As another example, the computer-readable media disclosed herein might be implemented using magnetic or optical technology. In such implementations, the software presented herein might transform the physical state of magnetic or optical media, when the software is encoded therein. These transformations might include altering the magnetic characteristics of locations within given magnetic media. These transformations might also include altering the physical features or characteristics of locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 700 in order to store and execute the software components presented herein. It also should be appreciated that the computer architecture 700 might include other types of computing devices, including hand-held computers, embedded computer systems, personal digital assistants, and other types of computing devices known to those skilled in the art.

It is also contemplated that the computer architecture 700 might not include all of the components shown in FIG. 7, might include other components that are not explicitly shown in FIG. 7, or might utilize an architecture completely different than that shown in FIG. 7. For example, and without limitation, the technologies disclosed herein can be utilized with multiple CPUS for improved performance through parallelization, graphics processing units ("GPUs") for faster computation, and/or tensor processing units ("TPUs"). The term "processor" as used herein encompasses CPUs, GPUs, TPUs, and other types of processors.

Figure 8:
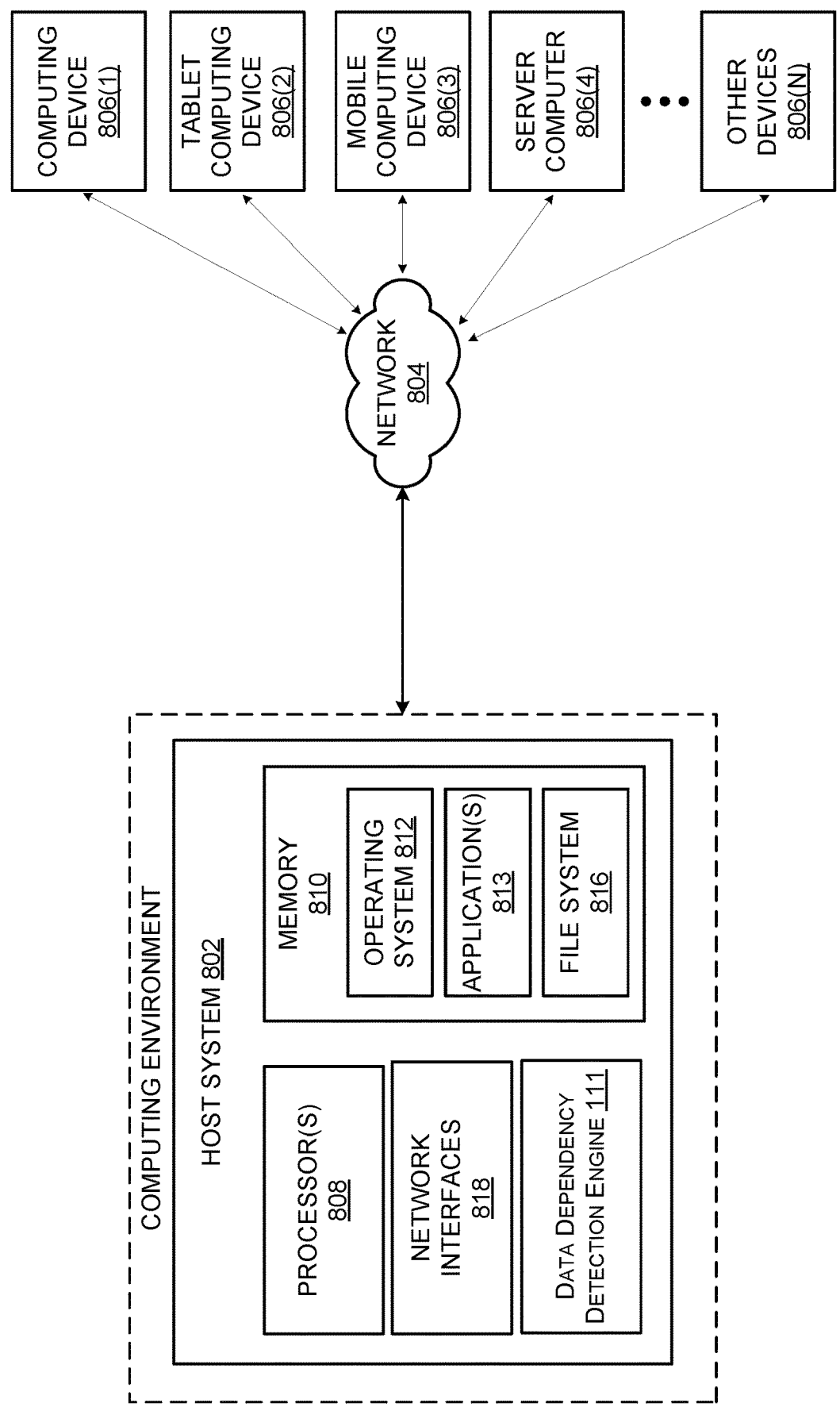
FIG. 8 is a data architecture diagram showing an illustrative example of a computing environment.

FIG. 8 illustrates an example computing environment capable of executing the techniques and processes described above with respect to FIGS. 1-6. In various examples, the computing environment comprises a host system 802. In various examples, the host system 802 operates on, in communication with, or as part of a network 804.

The network 804 can be or can include various access networks. For example, one or more client devices 806(1) . . . 806(N) can communicate with the host system 802 via the network 804 and/or other connections. The host system 802 and/or client devices can include, but are not limited to, any one of a variety of devices, including portable devices or stationary devices such as a server computer, a smart phone, a mobile phone, a personal digital assistant (PDA), an electronic book device, a laptop computer, a desktop computer, a tablet computer, a portable computer, a gaming console, a personal media player device, or any other electronic device.

According to various implementations, the functionality of the host system 802 can be provided by one or more servers that are executing as part of, or in communication with, the network 804. A server can host various services, virtual machines, portals, and/or other resources. For example, a can host or provide access to one or more portals, Web sites, and/or other information.

The host system 802 can include processor(s) 808 and memory 810. The memory 810 can comprise an operating system 812, application(s) 814, and/or a file system 816. Moreover, the memory 810 can comprise the Data Dependency Detection Engine 111 described above with respect to FIGS. 1-6.

The processor(s) 808 can be a single processing unit or a number of units, each of which could include multiple different processing units. The processor(s) can include a microprocessor, a microcomputer, a microcontroller, a digital signal processor, a central processing unit (CPU), a graphics processing unit (GPU), a security processor etc. Alternatively, or in addition, some or all of the techniques described herein can be performed, at least in part, by one or more hardware logic components. For example, and without limitation, illustrative types of hardware logic components that can be used include a Field-Programmable Gate Array (FPGA), an Application-Specific Integrated Circuit (ASIC), an Application-Specific Standard Products (ASSP), a state machine, a Complex Programmable Logic Device (CPLD), other logic circuitry, a system on chip (SoC), and/or any other devices that perform operations based on instructions. Among other capabilities, the processor(s) may be configured to fetch and execute computer-readable instructions stored in the memory 810.

The memory 810 can include one or a combination of computer-readable media. As used herein, "computer-readable media" includes computer storage media and communication media.

Computer storage media includes volatile and non-volatile, removable and non-removable media implemented in any method or technology for storage of information, such as computer-readable instructions, data structures, program modules, or other data. Computer storage media includes, but is not limited to, phase change memory (PCM), static random-access memory (SRAM), dynamic random-access memory (DRAM), other types of random-access memory (RAM), read-only memory (ROM), electrically erasable programmable ROM (EEPROM), flash memory or other memory technology, compact disk ROM (CD-ROM), digital versatile disks (DVD) or other optical storage, magnetic cassettes, magnetic tape, magnetic disk storage or other magnetic storage devices, or any other medium that can be used to store information for access by a computing device.

In contrast, communication media includes computer-readable instructions, data structures, program modules, or other data in a modulated data signal, such as a carrier wave. As defined herein, computer storage media does not include communication media.

The host system 802 can communicate over the network 804 via network interfaces 818. The network interfaces 818 can include various types of network hardware and software for supporting communications between two or more devices. The host system 802 may also include rules engine 819, which may be configured to implement aspects of the functionality disclosed herein.

The present techniques may involve operations occurring in one or more machines. As used herein, "machine" means physical data-storage and processing hardware programed with instructions to perform specialized computing operations. It is to be understood that two or more different machines may share hardware components. For example, the same integrated circuit may be part of two or more different machines.

It should be understood that the methods described herein can be ended at any time and need not be performed in their entireties. Some or all operations of the methods described herein, and/or substantially equivalent operations, can be performed by execution of computer-readable instructions included on a computer-storage media, as defined below. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

As described herein, in conjunction with the FIGURES described herein, the operations of the routines are described herein as being implemented, at least in part, by an application, component, and/or circuit. Although the following illustration refers to the components of specified figures, it can be appreciated that the operations of the routines may be also implemented in many other ways. For example, the routines may be implemented, at least in part, by a computer processor or a processor or processors of another computer. In addition, one or more of the operations of the routines may alternatively or additionally be implemented, at least in part, by a computer working alone or in conjunction with other software modules.

For example, the operations of routines are described herein as being implemented, at least in part, by an application, component and/or circuit, which are generically referred to herein as modules. In some configurations, the modules can be a dynamically linked library (DLL), a statically linked library, functionality produced by an application programing interface (API), a compiled program, an interpreted program, a script or any other executable set of instructions. Data and/or modules, such as the data and modules disclosed herein, can be stored in a data structure in one or more memory components. Data can be retrieved from the data structure by addressing links or references to the data structure.

In closing, although the various technologies presented herein have been described in language specific to structural features and/or methodological acts, it is to be understood that the subject matter defined in the appended representations is not necessarily limited to the specific features or acts described. Rather, the specific features and acts are disclosed as example forms of implementing the claimed subject matter.

What is claimed is:

1. A computer-implemented method for identifying data dependencies consumed by an application, comprising:
receiving a request to identify data dependencies consumed by the application;
retrieving a query plan that was generated by a data query processing engine, wherein the query plan was generated while processing a data query that was previously received from the application, and wherein the query plan includes a read command;
parsing the query plan to identify a data dependency identifier associated with the read command; and
sending the identified data dependency identifier to a computing device to identify a data dependency consumed by the application.

2. The method of claim 1, wherein the application is one of a plurality of loosely coupled applications, and wherein a data producing application of the plurality of loosely coupled applications exchanges data with a data consuming application of the plurality of loosely coupled applications by publishing data to a data dependency, allowing the data consuming application to retrieve the published data from the data dependency.

3. The method of claim 2, wherein the data dependency comprises a database, a table, a directory or a file located on a file system, a directory or file located on a distributed file system, or a table that displays data retrieved from a file on the distributed file system.

4. The method of claim 1, wherein the query plan comprises a hierarchy of nodes, wherein non-leaf nodes of the hierarch of nodes represent query commands, and wherein leaf nodes of the hierarchy of nodes identify data dependencies.

5. The method of claim 4, wherein the data dependency identifier is determined to be associated with the read command by identifying a non-leaf mode of the hierarchy of nodes that represents the read command and a leaf node of the hierarchy of nodes that descends from the non-leaf node and that includes the data dependency identifier.

6. The method of claim 1, further comprising:
retrieving a second query plan that was generated by the data query processing engine while processing another previously received data query, wherein the second query plan includes a write command;
parsing the second query plan to identify a second data dependency identifier associated with the write command; and
identifying the second data dependency identifier as identifying a data dependency produced by the application.

7. The method of claim 6, wherein the read command comprises a select command or a project command, and wherein the write command comprises an insert command or an update command.

8. A computing system for identifying data dependencies consumed by an application, comprising:
one or more processors; and
a computer storage medium having computer-executable instructions stored thereupon which, when executed by the one or more processors, cause the computing system to:
receive a request from a computing device to identify data dependencies consumed by the application;
retrieve a cached query plan that was generated by a data query processing engine, wherein the cached query plan was generated while processing a data query that was previously received from the application, wherein the query plan includes a hierarchy of nodes, wherein a non-leaf node of the hierarchy of nodes comprises a read command, and wherein a leaf node of the hierarchy of nodes comprises a data dependency identifier;
parse the query plan to identify that the data dependency identifier is associated with the data read command by determining that the leaf node is a descendant of the non-leaf node in the hierarchy of nodes; and
respond to the request by sending the data dependency identifier to the computing device.

9. The computing system of claim 8, wherein the computer-executable instructions further cause the computing system to:
   register, with a data dependency management and monitoring system, that the application consumes a data dependency identified by the data dependency identifier.

10. The computing system of claim 9, wherein the data dependency management and monitoring system sends an alert to the application in response to determining that the registered data dependency has been published.

11. The computing system of claim 9, wherein the data dependency management and monitoring system sends a second alert to the application in response to determining that the registered data dependency has become unavailable.

12. The computing system of claim 9, wherein the data dependency has been registered with the data dependency management system as being produced by a data producing application and as having a scheduled publication time, wherein registering that the application consumes the data dependency includes registering a delay tolerance, and wherein the delay tolerance determines how long the dependency management and monitoring system waits after the scheduled publication time for the data producing application to publish the data dependency before sending an alert to the application indicating that the data dependency has not been published.

13. The computing system of claim 8, wherein each of the one or more data dependency identifiers refer to a file or a directory located on a distributed file system, or to a database table.

14. The computing system of claim 8, wherein the query plan includes a write command, and wherein the computer-executable instructions further cause the computing system to:
   parse the query plan to identify a data dependency identifier associated with the write command; and
   send the identified data dependency identifier associated with data write command to the computing device as part of a list of data dependencies produced by the application.

15. A computer-readable storage medium having computer-executable instructions stored thereupon which, when executed by a processor of a computing device, cause the computing device to:
   receive a request to identify data dependencies produced by the application;
   retrieve a query plan that was generated by a data query processing engine, wherein the query plan was generated while processing a data query that was previously received from the application, and wherein the query plan includes a write command;
   parse the query plan to identify a data dependency identifier associated with the data write command; and
   send the identified data dependency identifier to a computing device to identify a data dependency produced by the application.

16. The computer-readable storage medium of claim 15, wherein the computer-executable instructions further cause the computing device to:
   retrieve a second query plan that was generated by the data query processing engine while processing another previously received data query, wherein the second query plan includes a read command;
   parsing the second query plan to identify a second data dependency identifier associated with the read command; and
   identifying the second data dependency identifier as identifying a data dependency consumed by the application.

17. The computer-readable storage medium of claim 16, wherein the computer-executable instructions further cause the processor to:
   receive a first application registration request to register a data producing application;
   receive a dependency publication registration request indicating that the data producing application publishes the data dependency, wherein the dependency publication registration request comprises a time at which the data producing application is scheduled to publish the data dependency;
   receive a second application registration request to register the application;
   receive a dependency subscription request indicating that the application depends on the data dependency produced by the data producing application;
   after the time at which the data dependency is scheduled to be published, determine whether the data dependency has been published; and
   if it is determined that the data dependency has been published, providing the data consuming application with an indication that the data dependency has been published.

18. The computing system of claim 17, wherein the dependency subscription request includes a contact address, and wherein providing the indication to the data consuming application comprises transmitting the indication to the contact address.

19. The computing system of claim 17, wherein the dependency subscription request includes a dependency delay tolerance, the computer-executable instructions further causing the computing system to:
   in response to determining that an amount of time elapsed since the data dependency was scheduled to be published exceeds the dependency delay tolerance, sending an alert to the data consuming application indicating that the data dependency has not been produced within the dependency delay tolerance.

20. The computing system of claim 17, wherein the computer-executable instructions further cause the one or more processors to:
   receive a downstream dependency request for the data dependency;
   in response to the downstream dependency request, recursively identify registered data dependencies that the data dependency depends on; and
   in response to the downstream dependency request, provide a list of the registered data dependencies that the data dependency depends on.

* * * * *